United States Patent [19]
DeRose et al.

[11] Patent Number: 6,167,409
[45] Date of Patent: *Dec. 26, 2000

[54] COMPUTER SYSTEM AND METHOD FOR CUSTOMIZING CONTEXT INFORMATION SENT WITH DOCUMENT FRAGMENTS ACROSS A COMPUTER NETWORK

[75] Inventors: Steven J. DeRose, E. Providence; James Apple, Pascoag, both of R.I.; Gavin T. Nicol, Tokyo, Japan; Michael J. Braca, Providence, R.I.

[73] Assignee: Enigma Information Systems Ltd., Bnei Brak, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,224

[22] Filed: Mar. 1, 1996

[51] Int. Cl.[7] ..................................................... G06F 17/21
[52] U.S. Cl. ............................................ 707/513; 707/10
[58] Field of Search ..................................... 395/774, 610, 395/200.03; 707/513, 10; 709/217–219

[56] References Cited

U.S. PATENT DOCUMENTS

| | | | |
|---|---|---|---|
| 4,539,653 | 9/1985 | Bartlett et al. | 364/900 |
| 4,587,633 | 5/1986 | Wang et al. | 364/900 |
| 4,594,674 | 6/1986 | Boulia et al. | 364/523 |
| 4,608,664 | 8/1986 | Bartlett et al. | 364/900 |
| 4,710,885 | 12/1987 | Litteken | 707/513 |
| 4,716,404 | 12/1987 | Tabata et al. | 340/723 |
| 4,803,643 | 2/1989 | Hickey | 364/523 |
| 4,823,303 | 4/1989 | Terasawa | 364/521 |
| 4,876,665 | 10/1989 | Iwai et al. | 364/900 |
| 4,912,669 | 3/1990 | Iwamoto et al. | 364/900 |
| 4,969,093 | 11/1990 | Barker et al. | 364/900 |
| 4,970,678 | 11/1990 | Sladowski et al. | 364/900 |
| 4,992,972 | 2/1991 | Brooks et al. | 364/900 |
| 4,996,665 | 2/1991 | Nomura | 364/900 |
| 5,001,654 | 3/1991 | Winiger et al. | 364/523 |
| 5,008,853 | 4/1991 | Bly et al. | 364/900 |

(List continued on next page.)

OTHER PUBLICATIONS

Bishop et al., "Express Yourself", *MacUser*, v. 8, n. 11, p. B17(9), Nov. 1992.

"EBT announces plans to support important new publishing standard:DSSL", http://www.sil.org/SGML/ebtDSSS-L.html, May 1995.

"HTML to the Max: A Manifesto for Adding SGML Intelligence to the World–Wide Web", Sperburg–McQueen et al., http://www.ncsa.uiuc.edu/SDG/IT94/Proceedings/Autools/sperburg–mcqueen/sperburg.html, Sep. 1994.

Brian K. Reid, "Scribe: A Document Specification Language and its Compiler," University Microfilms International, Dissertation Services (1991), pp. 53–141.

(List continued on next page.)

*Primary Examiner*—Joseph H. Feild
*Attorney, Agent, or Firm*—Brown Raysman Millstein Felder & Steiner LLP

[57] ABSTRACT

The ability to provide certain text in most, if not all, of the documents sent over the network by a server is provided by a mechanism which combines context information with a document, or document fragment, to be sent. The context information can be made dependent on the document type and defined by the style sheet. In particular, it may be defined by the style definition for a header or footer style for the particular document type. Such feature is particularly useful for generating copyright notices, button bars, or other text to be included in most or all document fragments sent over the network. The context information is defined by a declarative specification that operates on document structure which reduces document management effort.

95 Claims, 14 Drawing Sheets

U.S. PATENT DOCUMENTS

| | | | |
|---|---|---|---|
| 5,068,809 | 11/1991 | Verhelst et al. | 364/145 |
| 5,079,700 | 1/1992 | Kozoll et al. | 395/700 |
| 5,089,956 | 2/1992 | MacPhail | 395/600 |
| 5,108,206 | 4/1992 | Yoshida | 400/61 |
| 5,113,341 | 5/1992 | Kozol et al. | 364/419 |
| 5,119,491 | 6/1992 | Iwai et al. | 395/600 |
| 5,130,924 | 7/1992 | Barker et al. | 364/419 |
| 5,133,051 | 7/1992 | Handley | 395/148 |
| 5,140,521 | 8/1992 | Kozol et al. | 364/419 |
| 5,140,676 | 8/1992 | Langelaan | 395/145 |
| 5,142,615 | 8/1992 | Levesque et al. | 395/131 |
| 5,144,555 | 9/1992 | Takadachi et al. | 364/419 |
| 5,144,557 | 9/1992 | Wang et al. | 364/419 |
| 5,146,552 | 9/1992 | Cassorla et al. | 395/145 |
| 5,173,853 | 12/1992 | Kelly et al. | 364/419 |
| 5,181,162 | 1/1993 | Smith et al. | 364/419 |
| 5,182,709 | 1/1993 | Makus | 364/419 |
| 5,185,698 | 2/1993 | Hesse et al. | 364/419 |
| 5,202,977 | 4/1993 | Pasetes, Jr. et al. | 395/500 |
| 5,214,696 | 5/1993 | Keiser, II et al. | 380/4 |
| 5,220,657 | 6/1993 | Bly et al. | 395/425 |
| 5,241,624 | 8/1993 | Torres | 395/129 |
| 5,241,671 | 8/1993 | Reed et al. | 395/600 |
| 5,276,793 | 1/1994 | Borgendale et al. | 395/148 |
| 5,285,526 | 2/1994 | Bennett, III et al. | 395/100 |
| 5,293,473 | 3/1994 | Hesse et al. | 395/146 |
| 5,355,497 | 10/1994 | Cohen-Levy | 395/700 |
| 5,367,621 | 11/1994 | Cohen et al. | 395/148 |
| 5,384,703 | 1/1995 | Withgott et al. | 364/419.19 |
| 5,428,529 | 6/1995 | Hartrick et al. | 707/513 |
| 5,491,820 | 2/1996 | Belove et al. | 395/600 |
| 5,495,607 | 2/1996 | Pisello et al. | 395/600 |
| 5,524,253 | 6/1996 | Pham et al. | 395/800 |
| 5,530,852 | 6/1996 | Meske, Jr. et al. | 395/600 |
| 5,546,577 | 8/1996 | Marlin et al. | 395/600 |
| 5,553,216 | 9/1996 | Yoshioka et al. | 395/145 |
| 5,553,284 | 9/1996 | Barbara et al. | 395/600 |
| 5,557,720 | 9/1996 | Brown, Jr. et al. | 395/146 |
| 5,557,722 | 9/1996 | DeRose et al. | 707/513 |
| 5,572,643 | 11/1996 | Judson | 395/793 |
| 5,613,134 | 3/1997 | Lucus et al. | 395/788 |
| 5,623,652 | 4/1997 | Vora et al. | 395/610 |
| 5,634,051 | 5/1997 | Thomson | 395/605 |
| 5,644,776 | 7/1997 | DeRose et al. | 395/761 |
| 5,708,806 | 1/1998 | DeRose et al. | 395/615 |

OTHER PUBLICATIONS

Morgenstern, Dynaweb Server Holds SGML Books, MacWEEK,v.8,n.28,p. 12(1), Jul. 11, 1994.

Seybold, Tools for Internet Publishing Seybold Report on Publishing Systems,v.24,n.3,p. S16(5), Oct. 26, 1994.

Seybold, SGML in The News, The Seybold Report on Publishing Systems,v.23,n.19,p. 31(2), Jul 4, 1994.

Michalski, Content in Context, RELease 1.0,v.94,n.9,p. 1(13), Sep. 27, 1994.

"A technique for Sharing Data Among Elements of a Hierarchic Document," disclosed anonymously, No. 28983.

"Intelligent Text and Image Handling", Proceedings of RIAO '91, Apr. 2–5, 1991, Barcelona, Spain, (Amsterdam: Elsevier publisher (Amsterdam: Elsevier Publishers 1991), pp. 226–244.

Chamberlin, D., "Managing Properties in a System of Cooperating Editors", Proc. Int. Conf. On Electronic Publishing Publishing, Gaithersburg, MD, Sep. 1990 (Cambridge: Cambridge University Press, 1990), pp. 31–46.

J.H. Combs, A.H. Renear, and S.J. DeRose "Markup Systems and the Future of Scholarly Text Processing," Comm. Of the Assoc. For Computing Machinery, Nov. 1987, pp. 933–947.

Chamberlin et al., "Quill: an Extensible system for Editing Documents of Mixed Type," IEEE 1988, pp. 317–326.

S.J. DeRose, D.G. Durand, E. Mylonas and A.H. Renear, "What is Text, Really?" Journal of computing in Higher Education, 1990. vol. I, No. 2, pp. 3–26.

S.J. DeRose, "CDWord Tutorial," Dallas: CDWord project, Dallas Theological Seminary, 1989.

S.J. DeRose and D.G. Durand, "Applications of Hypertext to Humanistic Textual Scholarship," Unpublished manuscript submitted Jul. 22, 1987 for Hypertext '87 conference.

R, Furuta, J. Scofield, and a. Shaw, Documenting Formatting Systems: Survey, Concepts, and Issues, Computin Computing Surveys 14(3), 1982, pp. 417–472.

P. Kahn . "Webs, Trees, and Stacks: How Hypermedia System Design Affects Hypermedia Content, "Proceedings of Third International Conf. On Human–Computer Interaction, Boston, MA, Sep. 18–22, 1989.

S.P. Mudur, A.W. Narwekar and A. Moitra, "Design of Software for Text Composition," Software–Practice and Experience (9), 1979;pp. 313–323.

J.R. Remde, L.M. Gomez, and T.K. Landaur, "SuperBook: an Automatic Tool for Information Exploration–Hypertext?", Proceedings of Hypertext '87 Chapel Hill; Dept. of Computer Science, U of N. Carolina, 1987.

J.B. Smith and S.F. Weiss, "Formatting Texts Accessed Randomly," Textlab Report TR85–031, Chapel Hill; U of North Carolina, 1985.

D. Kurth, "The Art of Computer Programming," (Reading, Mass.; Addison–Wesley, 1973, pp. 332–338, 347–362.

N. Yankelovich, N. Meyrowitz, and A. van Dam, "Reading and Writing the Electronic Book," IEEE Computer, 18 (1985), pp. 15–30.

K. Robertson, J.M. Kelsey, and V. Yenbut, "ESP User's Guide," U. Of Washington, Computer Science Lab, Tech. Note #134, Rev. C. Sep. 20, 1982.

A.C. Shaw, "A Model for Document Preparation Systems," U. Of Washington, Dept. of Computer Science, Tech. Report No. 80–04–02, Apr., 980.

M.J. Fischer and R.E. Ladner, "Data Structures for Efficient Implementation of Sticky Pointers in Text Editors, Editors," U. Of Washington, Dept. Of Computer Science, Tech. Report No. 79–06–08, Jun. 1979.

T. Allen, R. Nix, and a. Perlin, "PEN: A Hierarchical Document Editor," In Proc. ACM Sigplan Sigoia Symp. Text Manipulation, Sigplan Notices (SCM) 16,6 (Jun. 1981), pp. 74–81.

S.A Weyer, "The Design of a dynamic book for information search," the J. Man–Maching Studies (1982), pp. 17, 87–107.

M.E. Frisse, Searching for Information in a Hypertext Medical Handbook,: Hypertext '87 Proceedings, Chapen Chapel Hill, North Carolina, 1987–, New York; ACM, pp. 57–66.

C.H. Irby, "Display Techniques for Interactive Text Manipulation," AFIPS Conference Proceedings, 1974 National Computer conf. And Exposition, vol. 43, Montvale, New Jersey; AFIPS Press, 1974.

D. Thrush and F. Mabry "An Interactive Hyper–Text of Pathology," Proceedings of Fourth Annual Symposiu,m Symposium on computer Applications in Medical Care, Nov. 1980.

S.A. Weyre and A.H. Borning, "A Prototype Electronic Encyclopedia," ACM Transactions on Office Information Systems, vol. 3, No. 1, Jan. 1985, pp. 63–88.

J.S. Brown, "Process Versus Product: A Perspective on Tools for communal and Informal Electronic Learning," J. Educational Computing Research, vol. 1(2), 1985, pp. 179–201.

D.D. Chamberlin et al., "Janus: An Interactive System for Document Composition," In proc. ACM Sigplan Notices (ACM) 16.6 (Jun. 1981), pp. 82–91.

C.Binder, "The Window Book Technology," Cambridge, Massachusetts: Box Company, 1986.

S.A. Borkin and J.M. Prager, "Some Issues in the Design of an Editor–Formatter for Structured Documents," IBM Cambridge Scientific Center Technical Report No. G320–2136, Sep. 1981.

D.C. Engelbart and W.K. English, "A Research Center for Augmenting Human Intellect," In Proc. Fall Joint Computer Conf., vol. 33, AFIPS Press, Arlington, Virginia, pp. 395–410.

N. Wirth, "Data Structures and Algorithms," Englewood Cliffs, New Jersey, Prentice Halls, 1976, pp. 242–245.

Chamberlin et al., "Janus: An interactive document formatter based on declarative tags", IBM Systems Inl. 21 21(3) 1982:250–271.

"Distributed Bindery Control System," 240/Research Disclosure Apr. 1993, disclosed anonymously, No. 34829.

```
   <!ENTITY EBT CDATA
        "ELECTRONIC BOOK TECHNOLOGIES, INC.">
45~<BOOK>
     <FRONTMATTER>
       <TITLE>HOW TO USE DYNATEXT</TITLE>
       <AUTHOR>&EBT;</AUTHOR>
     </FRONTMATTER>
46~<BODY>
     <CHAPTER>
       <CHAPTITLE>INTRODUCTION</CHAPTITLE>
       <SECTION>
         <SECTITLE>STARTING UP THE SYSTEM</SECTITLE>
         <P>TO START THE SYSTEM, TYPE
            <EMPH>DTEXT</EMPH></P>
         <P>AFTER THAT JUST BROWSE, AS SHOWN HERE:
49~         <ART FILE ="MYFIG12">
         </P>
48~    </SECTION></></BODY>
47~</BOOK>
```

Fig. 4

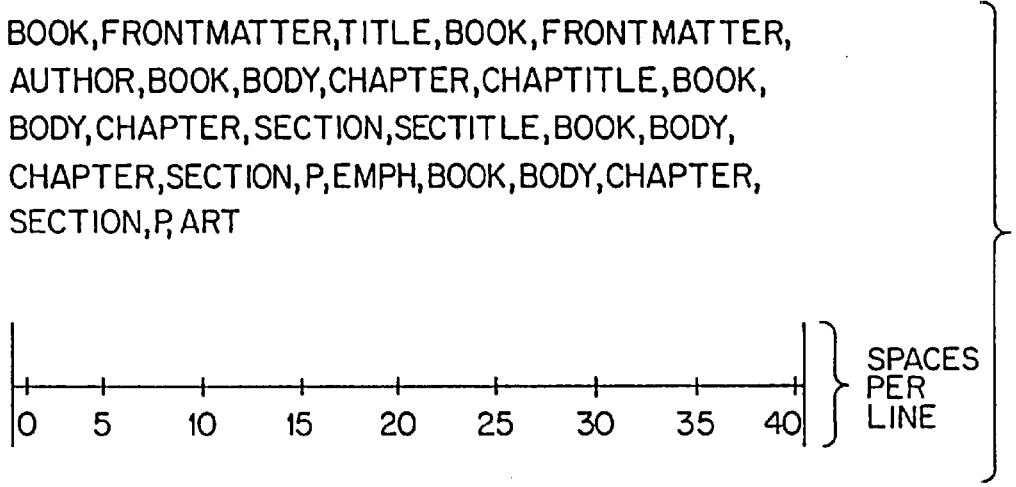

Fig. 7

| | PARENT (92) | FIRST CHILD (94) | LAST CHILD (96) | LEFT SIBLING (98) | RIGHT SIBLING (100) | TYPE NAME (102) | TEXT CONTENT (104) |
|---|---|---|---|---|---|---|---|
| 70 | NIL | 71 | 76 | NIL | NIL | BOOK | NULL |
| 71 | 70 | 72 | 74 | NIL | 76 | BOOK,FM | NULL |
| 72 | 71 | 73 | 73 | NIL | 74 | BOOK,FM,TITLE | NULL |
| 73 | 72 | NIL | NIL | NIL | NIL | #TEXT | <POINTER> |
| 74 | 71 | 75 | 75 | 72 | NIL | BOOK,FM,AUTHOR | NULL |
| 75 | 74 | NIL | NIL | NIL | NIL | #TEXT | <POINTER> |
| 76 | 70 | 77 | 77 | 71 | NIL | BOOK,BODY | NULL |
| 77 | 76 | 78 | 80 | NIL | NIL | BOOK,BODY,CHAP | NULL |
| 78 | 77 | 79 | 79 | NIL | 80 | BOOK,BODY,...CHAPTITLE | NULL |
| 79 | 78 | NIL | NIL | NIL | NIL | #TEXT | <POINTER> |
| 80 | 77 | 81 | 87 | 78 | NIL | ... | NULL |
| 81 | 80 | 82 | 82 | NIL | 83 | ETC. | NULL |
| 82 | 81 | NIL | NIL | NIL | NIL | ... | <POINTER> |
| 83 | 80 | 84 | 85 | 81 | 87 | ... | NULL |
| 84 | 83 | NIL | NIL | NIL | 85 | ... | <POINTER> |
| 85 | 83 | 86 | 86 | 84 | NIL | ... | NULL |
| 86 | 85 | NIL | NIL | NIL | NIL | ... | <POINTER> |
| 87 | 80 | 88 | 89 | 83 | NIL | ... | NULL |
| 88 | 87 | NIL | NIL | NIL | 89 | ... | <POINTER> |
| 89 | 87 | NIL | NIL | 88 | NIL | ... | <POINTER> |

TEXT VIEW
BICYCLE MAINTENANCE MANUAL
BRAKES
REPLACING AND DISASSEMBLING PARTS

REPLACING AND DISASSEMBLING PARTS

*BRAKE SHOES:*

SEE P. 218.

176

*CABLES:*

THE FREQUENCY WITH WHICH YOU WILL NEED TO REPLACE BRAKE (AND OTHER) CABLES DEPENDS ON HOW YOU USE YOUR BIKE. MACHINES CONSISTENTLY LEFT OUT IN THE RAIN, OR USED HARD EVERY DAY, ARE GOING TO NEED THEM SOONER THAN WELL-CARED-FOR OR AVERAGE-USE MACHINES. THERE IS NO HARD AND FAST RULE. ANY OBVIOUS DEFECT, SUCH AS A FRAYED CABLE, D FOR REPLACEMENT.

TEXT VIEW
BICYCLE MAINTENANCE MANUAL
BRAKES
ROUTINE ADJUSTMENTS

ROUTINE ADJUSTMENTS

CALIPER BRAKES

WHATEVER KIND OF CALIPER BRAKE SYSTEM YOU HAVE, THERE ARE TWO BASIC KINDS OF ADJUSTMENTS: (1) SEEING THAT THE BRAKE SHOE HITS THE WHEEL RIM PROPERLY, AND (2) KEEPING SLACK OUT OF THE CABLE BETWEEN THE BRAKE LEVER AND MECHANISM, SO THAT THE LEVER TRAVELS THE SHORTEST POSSIBLE DISTANCE WHEN PUTTING ON THE BRAKES.

FIRST CHECK TO SEE THAT THE WHEEL IS TRUE BY SPINNING IT AND SEEING THAT THE RIM, NOT THE TIRE, STAYS ABOUT THE SAME DISTANCE FROM THE BRAKE SHOE ALL THE WAY AROUND.

TABLE OF CONTENTS
BICYCLE

BICYCLE MAINTENANCE MANUAL
BRAKES
  GENERAL
  HOW CALIPER BRAKES WORK
  LUBRICATION
  " ROUTINE ADJUSTMENTS

```
# DEFAULT           # DELETE
  TITLE              H1
  CHAPTITLE          H2
  SECTION,SECTITLE   H3
  P                  P
  ART                A
```

Fig. 12A

```
<H1> How to Use Dyna Text </H1>
<P> Electronic Book Technologies, Inc. </P>
<H2> Introduction </H2>
<H3> Starting up the System </H3>
<P> To Start the system, type <B>dtext</B></P>
<P> After that just browse as shown here: <A
    href="ebt.com/pro/abook#EID(89)"></a></p>
```

Fig. 12B

COMPUTER SYSTEM AND METHOD FOR CUSTOMIZING CONTEXT INFORMATION SENT WITH DOCUMENT FRAGMENTS ACROSS A COMPUTER NETWORK

FIELD OF THE INVENTION

This invention is related to computer systems for electronic publishing.

BACKGROUND OF THE INVENTION

Electronic publication of documents, using non-paper media for transmission and storage, has become increasingly common. Electronically published documents are generally viewed by computer, and are preferably rendered or displayed on a computer screen or other output device in a formatted form. The DYNATEXT system, a computer system available from Electronic Book Technologies of Providence, Rhode Island, is a system which is particularly useful for this purpose for very large documents.

Electronically published documents are increasingly being made available using a general markup language. A markup language provides indications of structure of the document, but excludes streams of graphic display instructions which are typically found in formatted documents. Markup languages are more portable between a variety of different machines that may use different graphic display commands. A commonly used markup language is the Standardized General Markup Language (SGML), an ISO standard.

Client-server computer systems for electronically publishing documents have also become increasingly available. Such a system typically includes one computer system (the server) on which documents are stored so that other computer systems (the clients) can access the information. The server and client communicate via messages conforming to a communication protocol sent over a communication channel such as a computer network. The server responds to messages from clients and processes requests to transmit a requested document.

An example of a client-server computer system for retrieval of electronically published documents that use a markup language is the World Wide Web (WWW) on the Internet. The WWW is a "web" of interconnected documents that are located in various sites on the Internet. The WWW is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by T. Berners-Lee, et al., in *Electronic Networking: Research, Applications and Policy*, Vol. 1, No. 2, Meckler, Westport, Conn., Spring 1992.

Documents that are published on the WWW are written in the Hypertext Markup Language (HTML), such as described in *Hypertext Markup Language Specification*—2.01 by T. Berners-Lee and D. Connolly, Internet Draft Document, Oct. 14, 1994, and in "World Wide Web & HTML," by Douglas C. McArthur, in *Dr. Dobbs Journal*, December 1994, pp. 18–20, 22, 24, 26 and 86. HTML documents stored as such are generally static, that is, the contents do not change over time unless the publisher modifies the document.

HTML is a markup language used for writing hypertext documents. HTML documents are SGML documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

Each document available on the WWW has one or more identifiers called a Uniform Resource Identifier (URI). These identifiers are described in more detail in *Universal Resource Identifiers for the World Wide Web*, T. Berners-Lee, submitted as an Internet Request for Comments (RFC), as yet unnumbered. A URI allows any object on the Internet to be referred to by name or address, such as in a hypertext link in an HTML document. There are two types of URIs: a Universal Resource Name (URN) and a Uniform Resource Locator (URL). A URN references an object by name within a given name space. The Internet community has not yet defined the syntax of URNS. A URL references an object by defining a location and/or an access algorithm using network protocols. An example URL is "http://www.ebt.com" A URL has the syntax "scheme://host:port/path?selector" where "scheme" identifies the access protocol (such as HTTP, FTP or GOPHER); "host" is the Internet domain name of the machine that supports the protocol; "port" is an optional the transfer control protocol (TCP) port number of the appropriate server (if different from the default); "path" is an identification of the object; and "selector" contains optional parameters.

An Internet site which electronically publishes documents on the WWW documents is called a "Web site" and runs a "Web server," which is a computer program that allows a computer on the network to make documents available via the WWW. The documents are often hypertext documents in the HTML language, but may be other types of documents. Several Web server software packages exist that provide information on the Web, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft MS-DOS operating system and the Microsoft Windows operating environment. The Web server also has a standard interface for running external programs, called the Common Gateway Interface (CGI). A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Practical Extraction and Report Language (Perl) or Tcl or one of the Unix operating system shell languages. Perl is described in more detail in *Programming Perl*. by Larry Wall and Randal L. Schwartz, O'Reilly & Associates, Inc., Sebastopol, Calif., USA, 1992. The CGI standard specifies how the script or application receives input and parameters, and specifies how any output should be formatted and returned to the server.

A user (typically using a machine other than the machine used by the Web server) accesses documents published on the WWW runs a client program called a "Web browser."

The Web browser allows the user to retrieve and display documents from Web servers. Some of the popular Web browser programs are: the Navigator browser from NetScape Communications, Corp., of Mountain View, California; the Mosaic browser from the National Center for Supercomputing Applications (NCSA); the WinWeb browser, from Microelectronics and Computer Technology Corp. of Austin, Tex.; and the InternetWorks browser, from BookLink Technology, of Needham, Mass. Browsers exist for many platforms, including personal computers with the Intel Pentium processor running the Microsoft MS-DOS operating system and the Microsoft Windows environment, and Apple Macintosh personal computers.

The Web server and the Web browser communicate using the Hypertext Transfer Protocol (HTTP) message protocol and the underlying TCP/IP data transport protocol of the Internet. HTTP is described in *Hypertext Transfer Protocol—HTTP*/1.0 by T. Berners-Lee, R. T. Fielding, H. Frystyk Nielsen, Internet Draft Document, Dec. 19, 1994, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. For instance, to retrieve a static document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, if a user completes in a form requesting a database search, the Web browser sends an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

At present, interaction between Web browsers and Web servers has a number of drawbacks. First, when a document is retrieved from a server by a client, the client must load the entire document into the client's memory. There is no protocol for accessing only a portion of a document. To provide acceptable performance, publishers are forced to maintain a large document as a collection of small document fragments, typically less than a few tens of printed pages equivalent in length. Such collections of small document fragments lead to document management problems.

Another drawback is that Web browsers and servers generally do not support many navigation tools to enhance reader navigation of a document once received by the client. Generally, navigation is limited to scrolling, string searches, and links within a document. There generally is no table of contents or index that takes advantage of a document structure unless it is created and maintained by the publisher as a separate document, thus requiring more document management effort.

Another restriction of the Web is that the destination of a link must always be an entire document file identified by its URL. There is no protocol for linking to targets that are a portion of a document. Although bookmarks may be used which are in the form of "http://x.com/doc.html#chap4", using such a URL causes the whole document "doc.html" to be loaded and causes the client browser to scroll to the portion labeled "chap4". Since, in practice, though not necessarily in theory, URLs point to entire documents, the protocol effectively requires transfer of an entire document when requested. The use of whole documents in the current implementation of the World Wide Web requires end users to wade through irrelevant information after invoking a hyperlink unless publishers commit to managing reusable information in many little files.

Using HTML for electronic publishing has additional problems. For example, if an application-specific SGML DTD is used by a publisher, the content must be down-converted to conform to the HTML document type before it can be retrieved via a Web browser. Potentially useful information, attributes and structure may be lost during conversion from SGML to HTML, because HTML tags are limited, providing a fixed set of distinctions inadequate for effective information retrieval across a wide variety of document types. Even if tags are added to the HTML standard as it evolves, such changes would require documents written in HTML to be changed to take advantage of the new tags, thus requiring further document management effort. As a result of the limitations of HTML, optimization of information retrieval capabilities using document structure are lost.

Web browsers also do not typically provide much control over the style or format to be applied to document elements. The same document is generally viewed in the same way every time, with variations depending only on the size of the window on the computer screen which they are viewed. Sophisticated view controls that show information selectively (e.g., based on an access authorization code for security) are not available. Additionally, publishers cannot effectively support similar documents that have multiple views of a single deliverable. Instead, WWW publishers must either indicate all exceptions in a single document or replicate the shared content in multiple files. The end result is that either the end user is presented with irrelevant information or publishers must perform redundant maintenance.

Yet another problem with the Web browsers is that they have no collection-level or structure-aware full-text searching. The only way to find out about a document is to know its URL in advance. Because systems are aware of only document level information, navigation of systems like the World Wide Web required development of massive centralized databases such as Lycos, Yahoo and inefficient "web crawlers." Once inside a document only rudimentary string search operations are supported, and there is no full-text index. A few Web servers support full-text search across documents via WAIS, which is not structure-aware. Thus, it can be difficult for a user to find relevant information because browsers generally a) have no full-text search across large collections of documents, b) have no support for Boolean expressions or proximity searches, and c) are more difficult for users to find relevant information because they cannot use the SGML structure to narrow the scope of a search to particular fields or information elements using SGML attributes.

Yet another problem is that there is little data anywhere but on the World Wide Web which conforms to the HTML document-type definition. Also, a number of client systems, also known as Web browsers, are providing their own enhanced versions of HTML which results, or may result, in incompatibility among the different types of systems. At present, although client information may be received by a server system, most server systems do not include the processing capability to be client-aware in selecting and formatting documents, and thus require that multiple versions of documents be made available to accommodate for different client systems.

An additional problem with systems like Web servers, which may use a CGI script to execute a general program, is that such general programs are procedural and operate without knowledge of document structure. For example, a program may try to modify a section by searching for start and end tags as strings. This fails because in most markup languages tags may be abbreviated or omitted, making string matching unreliable. Likewise, strings that appear to be tags, but which are not, may also appear in a document, again causing failure in a string matching program.

An additional problem with publishing on the World Wide Web is that often a publisher wishes to include certain text in most, if not all, of the documents sent over the network by the server. This text may also change over time. Some facilities exist through which one document may include another by some form of "include" statement. However, such a facility still requires editing a document to have the "include" statement. Such an implementation may not be practical for a large number of documents, and still requires additional unnecessary document management effort.

SUMMARY OF THE INVENTION

The ability to provide certain text in most, if not all, of the documents sent over the network by a server is provided by a mechanism which selects a document fragment to be sent and transforms the document fragment according to the structure of the document, the document type, the client and the environment. This transformation may be implemented using the style sheet for the document type of the document from which the fragment is selected. Such a transformation may be used to insert context information. In particular, the context information may be defined by the style definition for a header or footer style for the particular document type. Such a feature is particularly useful for generating copyright notices, button bars, or other text to be included in most or all document fragments sent over the network. By using a declarative specification that operates on document structure, rather than a procedural specification that operates on character stream files, this capability is provided in a manner that reduces document management effort.

Accordingly, one aspect of the invention is a computer system for making available electronically published documents of different types in response to request for the documents received according to a communication protocol. The computer system receives an indication of a requested document and selects at least a portion of the content of the requested document. Additional content is then determined according to the type of the requested document. This additional content is combined with the selected portion of the requested document to obtain an output document. The output document is packaged by the computer system and is transmitted according to the communication protocol.

Another aspect of the invention is computer-implemented process, for making available electronically published documents of different types in response to request for the documents received according to a communication protocol. This process includes receiving an indication of a requested document, and selecting at least a portion of the content of the requested document. Next, additional content is determined according to the type of the requested document. Additional content is combined with the selected portion of the requested document to obtain an output document. Finally, the output document is packaged and transmitted according to the communication protocol.

BRIEF DESCRIPTION OF THE DRAWING

In the drawing,

FIG. 4 is an illustration of a sample document with descriptive markup;

FIG. 6 is an illustration of an element directory with example values corresponding to the document of FIGS. 4 and 5;

FIG. 7 is an illustration of a fully-qualified name table with example values corresponding to the document of FIG. 4;

FIGS. 9–11 are example display views produced for tables of contents, full-text searches and document fragments;

FIG. 12A shows a sample DTD mapping table;

FIG. 12B shows a sample HTML document which results from the DTD mapping table of FIG. 12A and the SGML sample document of FIG. 4;

DETAILED DESCRIPTION

The present invention will be more completely understood through the following detailed description which should be read in conjunction with the attached drawing in which similar reference numbers indicate similar structures. References cited herein are hereby expressly incorporated by reference.

The present invention provides a document retrieval system for electronically published documents, particularly those written using a general markup language. A markup language consists of tags which are used to prepare a structured document. One commonly-used markup language is the standardized general markup language (SGML) which is International for Standards Organization (ISO) standard 8879-1986. There are well-defined forms of SGML documents. Thus, parsing of SGML documents is easier. Other markup languages include LaTex and Scribe.

One embodiment of the invention handles documents written using SGML. Such documents are processed to improve searching and retrieval time of document portions. Such processing is described in U.S. patent application Ser.

No.07/733,204, filed Jul. 19, 1991, now U.S. Pat. No. 5,557,722, which is hereby incorporated by reference.

The system described in the U.S. Pat. No. 5,557,722 can be modified in accordance with the teachings herein to act as a server which provides electronically published documents to client viewer systems which receive and process documents in a markup language. Such a server would be useful as a Web server on the WWW to down-convert SGML documents to HTML documents, as will now be described.

Figure 1:
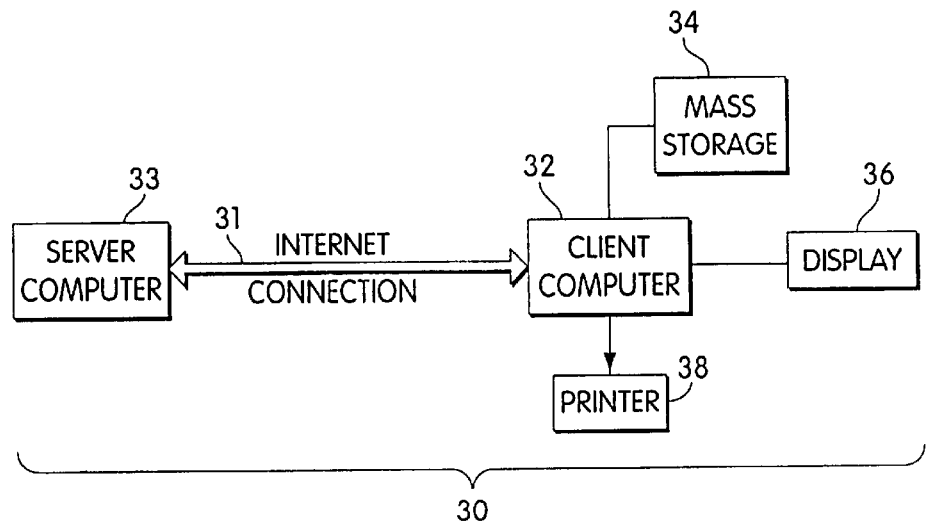
FIG. 1 is an illustration of a general purpose data processing system.

Referring now to FIG. 1, a data processing system 30 includes a client computer 32 which has a mass storage device 34, such as a disk drive. The mass storage device 34 may be internal (not shown) or external (as shown) to the client computer 32. The data processing system 30 also includes an output device such as a monitor, or graphic display 36 and, optionally, printer 38. The client computer 32, combined with display 36, may be programmed to enable multiple simultaneous views, popularly known as "windows", which facilitate providing the user with access to multiple processes. One of these processes may be a client program such as a Web browser.

The client computer 32 is connected to a server computer 33 via an interconnection 31. The interconnection 31 may be permanent or temporary, and may be any form of computer network such as the Internet, private LAN, modem connection, etc. The server computer is configured to run a server program, such as a Web server. The client computer 32 may execute any of a number of client programs, such as a Web browser.

Figure 2:
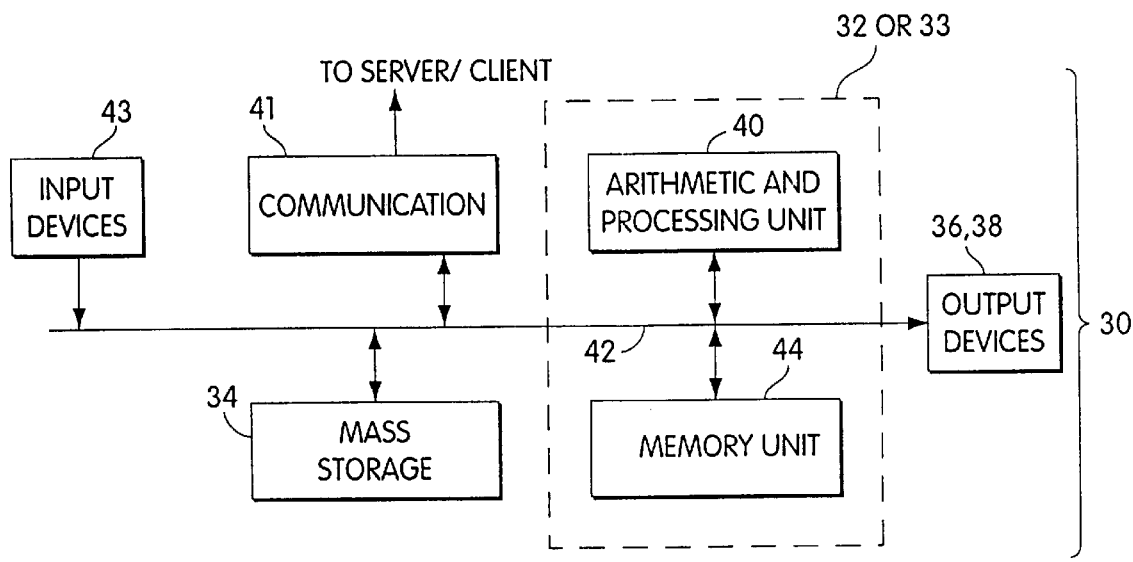
FIG. 2 is a block diagram of the data processing system of FIG. 1.

FIG. 2 shows further detail of the structure of either the client or server computers. Computer 32 or computer 33 includes a processing and arithmetic unit 40 and a memory unit 42 connected to the processing unit via an interconnection mechanism 44 such as a bus. Mass storage 34 is also connected to the memory unit and processing unit via the interconnection mechanism 44 along with the output devices 36 and 38. Input devices 43, such as a keyboard, mouse, tablet, trackball and other device may be provided. A communication connection 11, such as a modem or network interface card, is also provided to make the connection to the client or server.

The data processing system 30 may be implemented using a number of general purpose computer platforms, such as the IRIX 5.x, from Silicon Graphics, Inc., of Mountain View, Calif. Other example platforms are DOS, WindowsNT, Windows95, Solaris 2.x, HPUX 9.x, IBM AIX 3.2.x, DEC Alpha/OSF 3.x, UnixWare 2.x and Solaris X86.

The data processing system 30 is configured to be a specific machine or to perform a process using a computer programming language, such as the "C++" programming language. It should be apparent to those skilled in the art that the present invention is not limited to a specific programming language or a specific general purpose data processing system and that other appropriate programming languages and other appropriate general purpose data processing systems could also be used.

Figure 3:
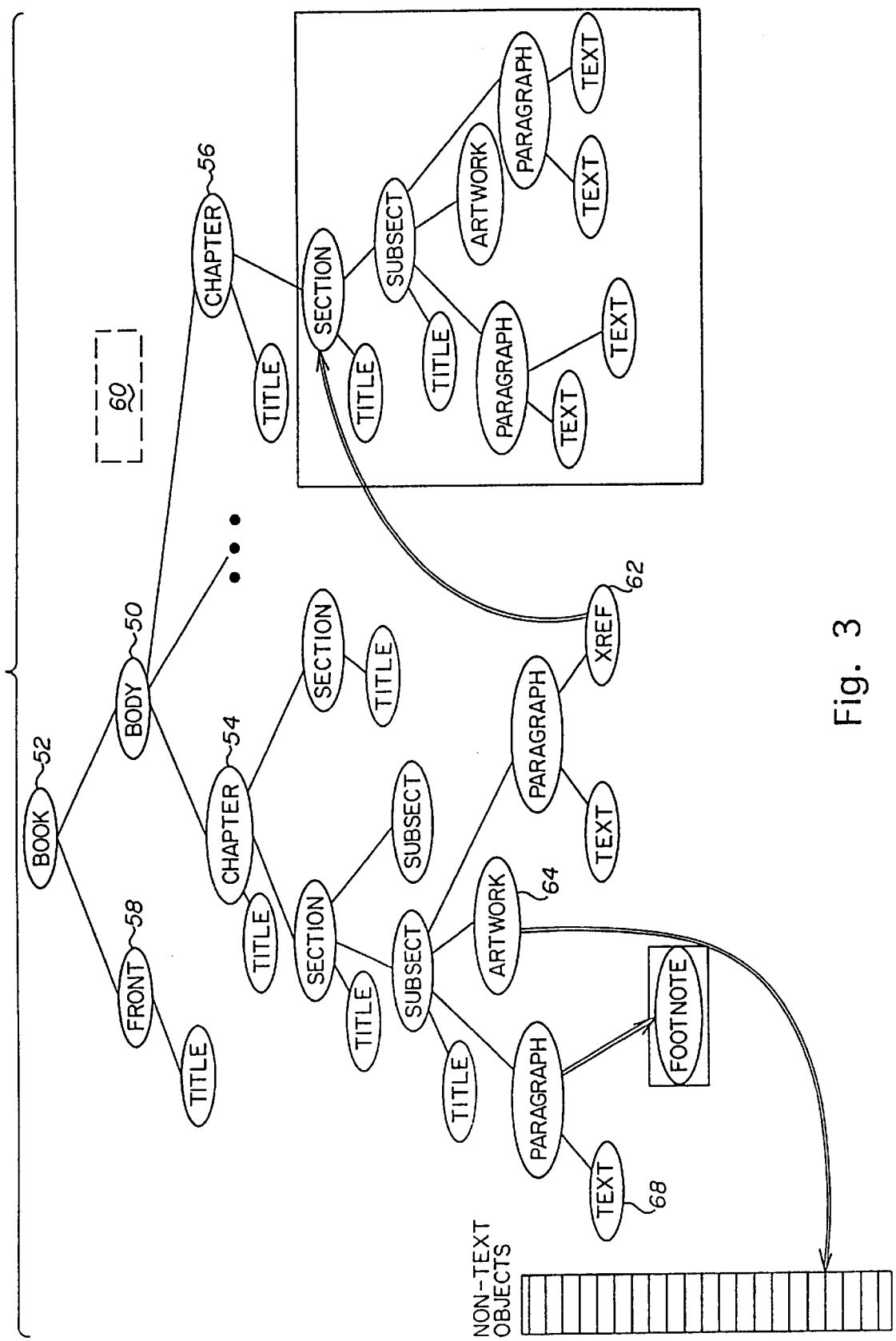
FIG. 3 is a diagrammatic illustration of the hierarchical structure of an example document with descriptive markup.

The computer system described herein handles structured documents in electronic form and include text content, descriptive markup and possibly non-text content. This system is particularly useful with large electronic documents, of which typical examples are electronic books such as operation manuals for large systems, such as computer systems, airplanes and ships. The descriptive markup of an input document is interpretable as an ordered hierarchy of content objects, such as illustrated in FIG. 3. That is, the descriptive markup defines a structure including a set of elements which, when taken together, form a tree or similar hierarchical object. A markup element describes the function or meaning, rather than the appearance, of the text which it includes. Elements representing only appearance or format characteristics may be used, but are non-optimal.

In such a document, an element, e.g. element 50 of FIG. 3, may have a parent element (52), a first child element (54), a last child element (56), a left sibling element (58), and a right sibling element (60). In the example just described, a right sibling of element 50 does not exist in the document, and is therefore defined by "nil", or some non-element identifier. Similarly, if an element does not have first or last children elements, a left sibling element, or a parent element, the corresponding values are also defined to be 'nil' or some other non-element identifier. The text content elements 68 of a document are normally found as the leaves of a tree.

A document may also include other types of elements which do not describe function, meaning or appearance of the text. These types of elements include cross-referencing elements 62 which may be used to link relevant sections of a document or even separate documents. Artwork elements 64 may be used to point to non-text objects, such as graphic raster files, which also may be separate electronic documents.

An example of a descriptive markup language for electronic documents is specified by ISO standard 8879: Standard Generalized Markup Language, or, "SGML". This standard is described in "Information Processing—Text and Office Systems—Standard Generalized Markup Language (SGML)," by the International Organization for Standardization, ISO 8879-1986(E), which is hereby incorporated by reference. Documents in SGML may be created using standard text editors, such as SoftQuad Author/Editor, which is commercially available from SoftQuad, Inc., of Toronto, Ontario, Canada. The "Scribe" and "LaTeX" word processing languages are similar document markup languages. Other suitable markup languages may also be used.

Documents which comply with the SGML standard are particularly useful because of the acceptance of the standard by publishers and government agencies. SGML-compliant documents may be made from other types of documents using commercially available systems. A simple exemplary SGML compliant document is provided in FIG. 4.

An SGML document includes markup tags which may be described as start tags, end tags, or empty tags. An empty tag may be understood as being both a start tag and an end tag. In this sample document of FIG. 4, start tag 45 begins a markup element. An end tag, such as end tag 47, ends the corresponding markup element. Thus start and end tags define a markup element. Elements having start and end tags occurring between the start and end tags of another element (as tags 46 and 48 are between tags 45 and 47) are defined to be children, descendants, or lower elements of the tree. The containing markup element is called a parent or ancestor element. Children at the same level beneath a parent are siblings.

Some of the tags in the descriptive markup of the document may also be empty tags such as tag 49 (FIG. 4). Such empty tags may be used for cross-referencing, referencing other documents, or for referencing graphic or other types of non-text information, etc. Tags often have attributes which are variables, such as "file", which are assigned to values, such as "myfig12". Attributes may be interpreted when the document is rendered to retrieve graphics files, etc. Normal start tags 45 may also include attributes which are often useful for marking text which is to be hidden for security or other reasons, or for attaching a unique identifier for an element for cross-referencing or other uses. For example, when a document is rendered, an attribute for a start tag may be examined, and if the attribute has a predetermined value, display of that material may be prevented or modified, thus providing security for a document.

Figure 5:
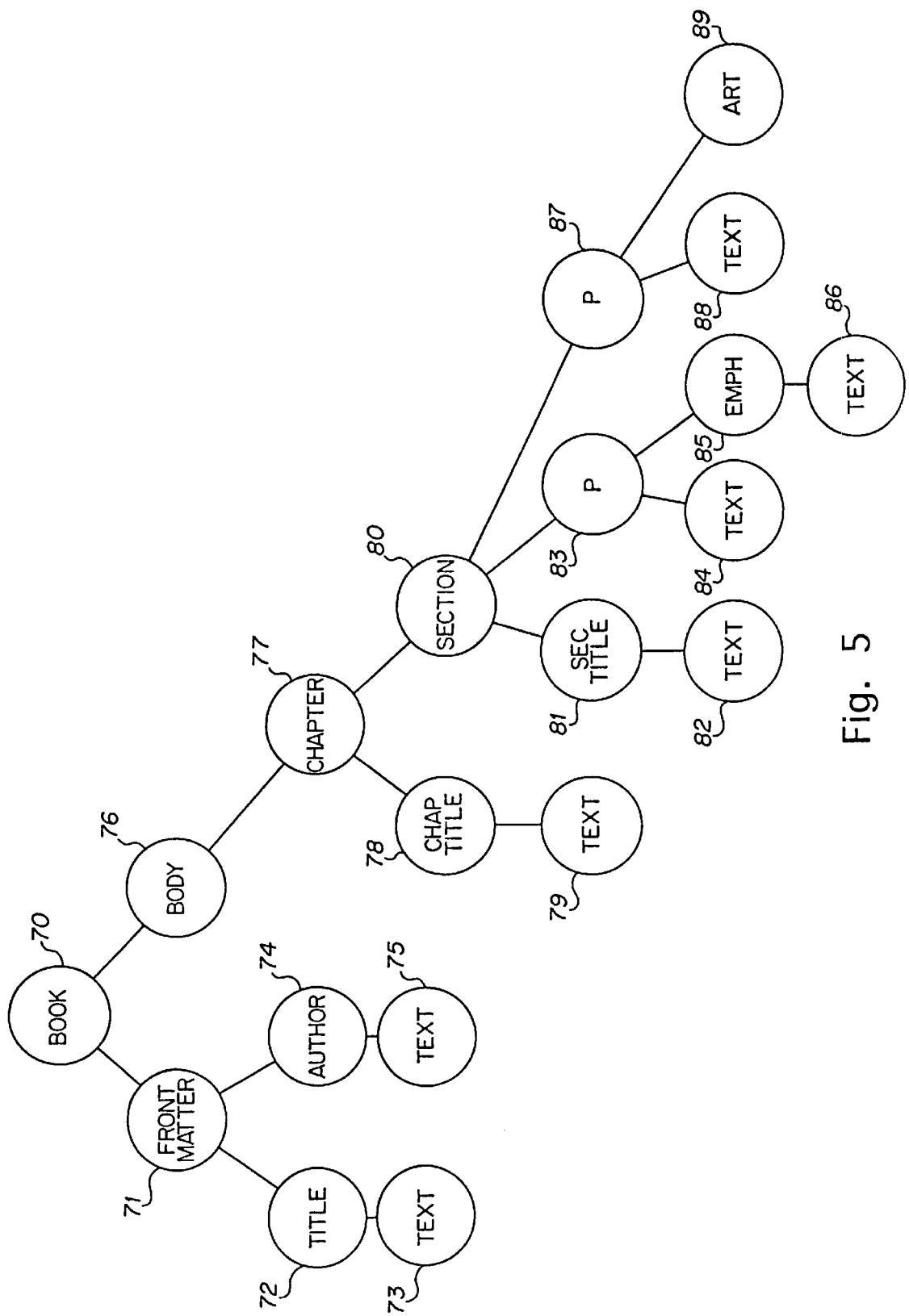
FIG. 5 is a diagrammatic illustration of the hierarchical structure of the sample document of FIG. 4.

FIG. 5 is a representation of the tree structure generated from the sample SGML document of FIG. 4. The process of generating this representation is described in U.S. Pat. No. 5,557,722. Reference numbers 70–89 have been assigned to the elements defined by the markup structure of the SGML document. Sequential numbers, or element identifiers may be assigned to each element appearing in the document according to the order of appearance of these elements in the document. These element identifiers are used in the generation of the element directory 91 (FIG. 6), which is used to assist navigation of the document.

The data structure of FIG. 6, the element directory 91, is an array of element descriptors 90. Each element descriptor 90 represents an element of the document. In one embodiment, an element descriptor 90 is easily retrieved from the array on the basis of the element identifier which is assigned to its corresponding element. The element descriptor 90 includes a field 92 for representing the parent of the element, a field 94 for representing the first child, a field 96 for representing the last child, a field 98 for representing a left sibling, a field 100 for representing a right sibling, a field 102 for representing the type of the element, and a field 104 for representing the location of text characters for a text chunk or the location of other data associated with the element such as attributes. Typically, a separate document is maintained in which text context is stored. Field 104 may be pointer to a location in this document. Alternatively it may be an offset and length in the original SGML document. Those fields which represent elements, such as parent, child and sibling elements, may contain the element identifiers assigned to those elements.

The above-described representation of an element descriptor may be further optimized for documents which are not modified after its element directory is generated. In this case, the element identifier of a first child of an element is the immediately succeeding element identifier of that element. Thus, this field may be reduced to a one-bit representation, e.g. '1' may indicate that there is a first child and '0' that there are no children.

Another variation for the element directory 91 may include element descriptors 90 of variable size. Since a descriptor 90 may have a few NIL values, the size of the corresponding fields may be reduced. An element descriptor 90 may then be accessed from a file according to the offset or location in the file and length of the descriptor 90. Element identifiers assigned to element descriptors may be mapped to the values of the offset and length of their corresponding element descriptors. Such a modification may reduce the size of the element directors 91, but increases the time it takes to access an element descriptor.

In the example of FIG. 6, element descriptor 90 corresponds to element 70 of FIG. 5. Since element 70 does not have a parent element, parent field 92 includes a non-element value. Similarly, left and right sibling fields 98 and 100 also include non-element values. Field 102 includes a representation that element 70 is of the type, "book".

The size of element type field 102 may be kept constant across all element descriptors. In one embodiment, the element type in field 102 is represented by a pointer to another data structure, or data file, called the fully-qualified name table. The fully-qualified name table is a list of element types encountered in the document. The pointer includes a representation of the offset, or location, of the element type in the fully-qualified name table and possibly the length of the type name.

One embodiment of a fully-qualified name table is represented as a compressed list in FIG. 7. The list is compressed by representing as many sequential types as possible in a compressed form. That is, rather than having a list of:
  "BOOK"
  "BOOK,FRONTMATTER"
The list is compressed to "BOOK,FRONTMATTER". Thus, repeated occurrences of a partial or complete type name may be eliminated. The table of FIG. 7 corresponds to the example document represented by FIGS. 4–6 and is to be understood as a stream of characters. Thus, as an example, field 102 for element 70 (of type "BOOK") would show an offset of 0 and a length of 4, since the first occurrence of "BOOK" is at the beginning of the table and has a length of four characters. Similarly, the entry for field 102 for element 76, i.e. the element whose parent is 70 and first child is 77, would have an offset of 47 and a length of 9, since the first occurrence of "BOOK, BODY" occurs at the 47th character in the table and is 9 characters long. Likewise, element 71 ("BOOK, FRONTMATTER") has an offset of 0 and a length of 16. Various other methods of representing a fully-qualified name for the element may be used, such as a list of fully-qualified names retrieved according to their placement in the list. However, it may be desirable to keep the size of this table sufficiently small to allow the fully-qualified name table to be loaded into RAM.

Creation of the full text index of the document will now be described in connection with FIG. 8. Full text indexers which find and report the number of occurrences of selected words in a document have been known for some time. Such an indexer would determine, for example, that in the sample document of FIG. 4, the word "starting" occurs once, and the word "system" occurs twice. However, such systems normally identify only the total number of occurrences of a word in a document or in a certain level of granularity of a document, such as a paragraph. In one embodiment of this invention, the number of times a word is found in each element and sub-element of different levels of a document is recorded. The procedure for obtaining this result is called hierarchical indexing. Hierarchical indexing is described in U.S. Pat. No. 5,557,722, and uses a data structure as shown in FIG. 8.

Figure 8:
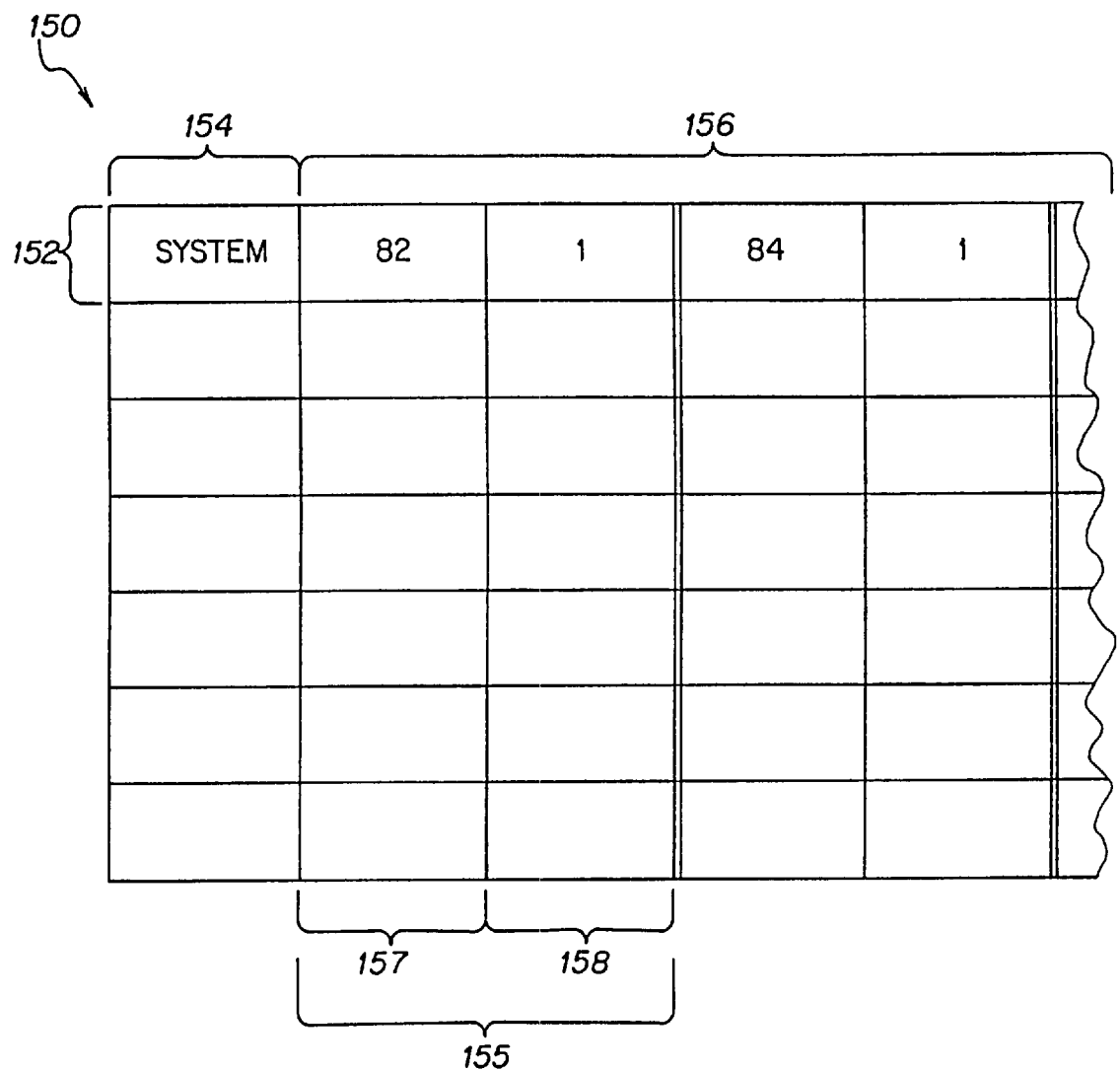
FIG. 8 is an illustration of a frequency record for full text indexing.

FIG. 8 illustrates a frequency record table 150 which includes an entry 152 for an indexed word. An entry 152 includes a field 154, which represents the word and records 156 which make an ordered list of pairs of an element identifier (field 157) of the element in which the word (field 154) occurs, and the number of appearances of that word in that element (field 158).

The frequency record 150 is slightly different in initial result for the different methods. With the first method, the resulting frequency record for a word initially includes the number of occurrences of that word for the different leaves of the tree, i.e., the text chunks. When a document is searched for a word by a user, a summation of occurrences of the word in each element of the document performed in the manner described in U.S. Pat. No. 5,557,722. According to the second method, the frequency record for a word includes the number of occurrences of a given word in each element or sub-element of the document rather than only in the leaf elements. This method is normally performed as a user-independent process, before a user views the document.

The procedure for this method is also described in U.S. Pat. No. 5,557,722. With both methods, the result visible to the viewer of the document is the same.

The architecture described above simplifies access to very large documents in a client-server system across the Internet or other computer networks by reducing the amount of information that is transmitted and by improving navigational and viewing tools. One aspect of this improvement is provided by using an element locator, which indicates an element within a document, in combination with a document locator, such as a file name or URL. The element locator is a starting point from which viewing of a document can begin which eliminates the need to transmit an entire document across a computer network.

Figure 9:
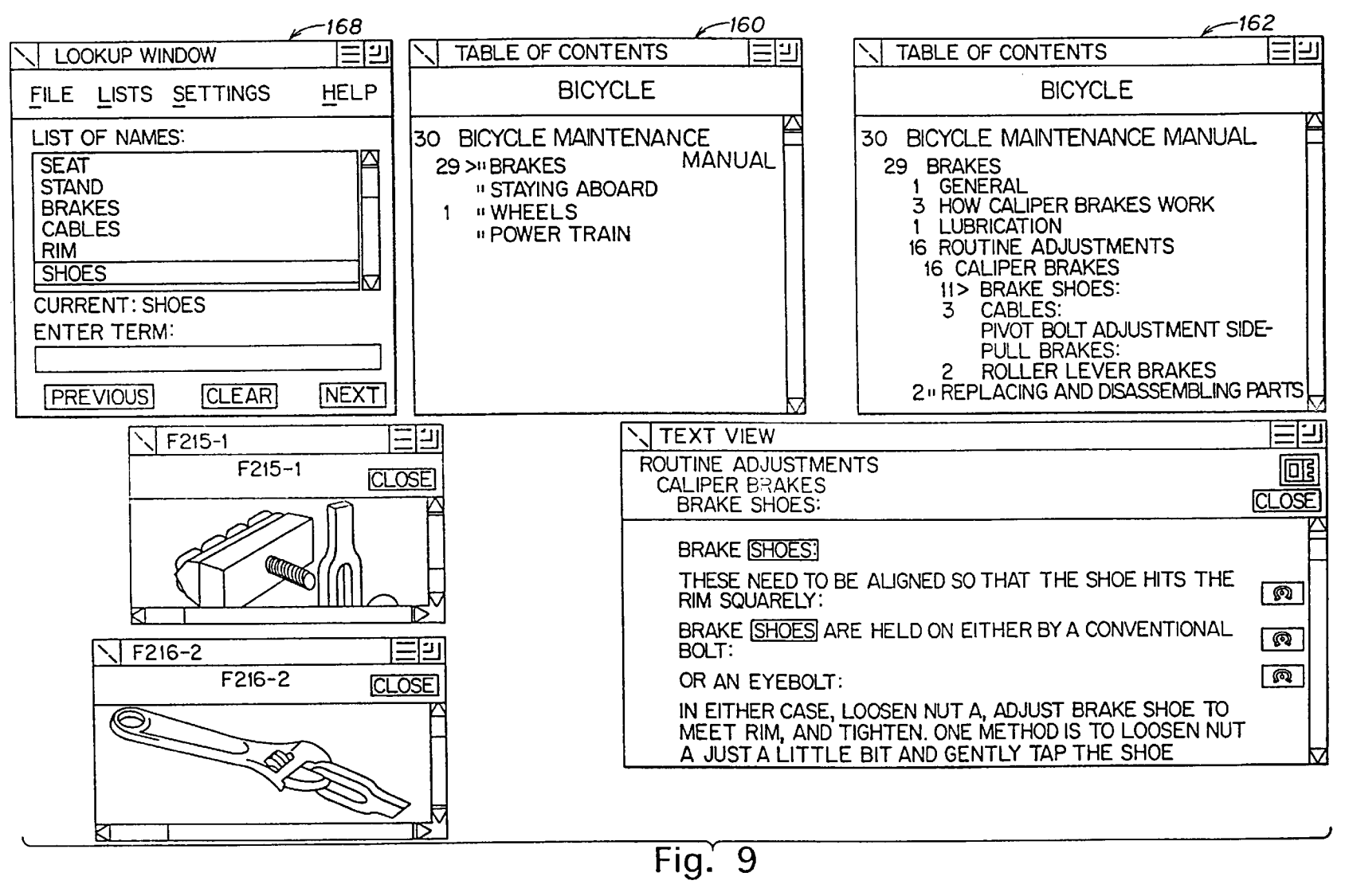
Figure 10:
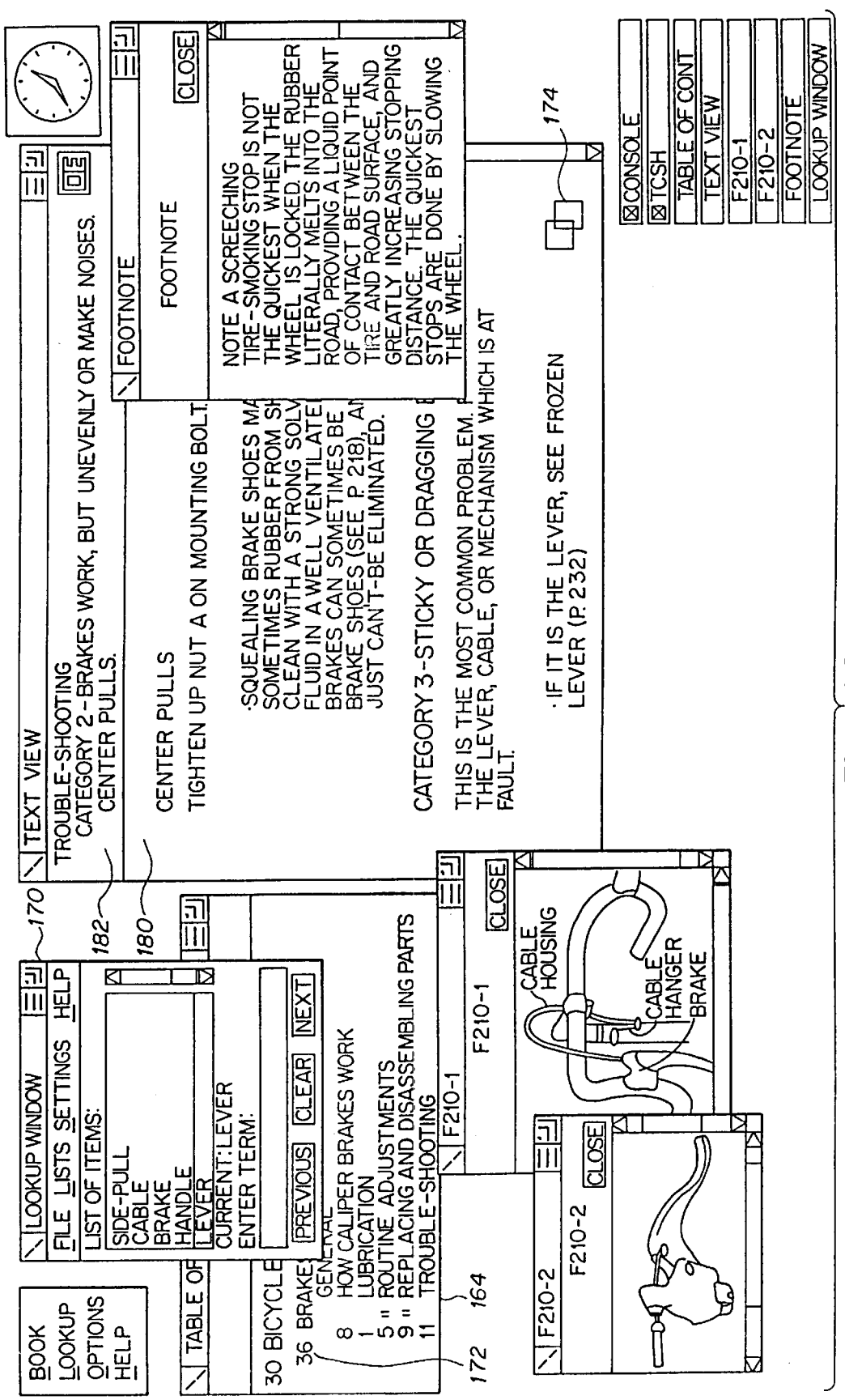

A variety of mechanisms may used for obtaining from a user a desired starting point from which rendering of a document may begin. One well-known mechanism is a table of contents from which a section of a document may be selected, such as shown in FIG. 9 and FIG. 11. A user may also have a directed path, bookmark, history log or other list of preselected starting points. A user may also perform a search for a word based on the full text index, in known ways of the type as shown in the displays of FIGS. 9–10, to begin rendering at a selected occurrence of a word. Additionally, a document, while being rendered, may cause possible cross-references to be displayed, as shown in FIGS. 10–11. These cross-references may also be used to select a starting point for rendering of the document.

A reference to an element within a document may exist in many forms. Generally, this starting point is defined by a reference to the document on the server (herein called a document locator), combined with a reference to an element within the referenced document (herein called an element locator). For example, in an embodiment to be used on the WWW, a document locator may be a URL: "http://www.ebt.com/pro/abook". In a private LAN, the document may be an actual file name in the file system. An element locator may be an element identifier for the element as defined using the element directory 91, such as the number thirteen. Thus the thirteenth element of the "abook" document may be accessed using the following string: "http://www.ebt.com/pro/abook#EID(13)". An element locator may also be in any format which can identify uniquely an element. Several such representations are used by the Text Encoding Initiative (TEI) or the Hytime ISO standard 10744. For example, the element locator may be identified by a numerical index representing the child number at each level of the tree along the path to the selected element. For example, the string "1-5-7-1" represents the first child of the seventh child of the fifth child of the first child of the root node. Each number in this list may also be qualified by element type so that instead of representing the "nth" child, the number may represent the "nth" chapter or section, for example. Such a representation of the element locator may also be used to traverse an element directory 91 shown in FIG. 6. Alternatively, an unparsed representation of the SGML file may be used, but would require parsing of the SGML document using the element locator to access the document fragment indicated by the element locator. Parsing of an SGML document is described in U.S. patent application Ser. No. 07/722,204 and can be modified to allow for matching an element locator.

The process of down-converting a fragment of a document in one markup language to a document in another markup language, using a document locator which includes an element locator, will now be described in connection with FIGS. 12–16. While this description is provided using HTML as the target markup language and SGML as the source markup language, it should be understood that other target and source markup languages could be used. FIG. 12B illustrates an HTML document that results from the SGML sample document shown in FIG. 4. It includes a cross reference that is an element within a document. In particular, the art element 89 as shown in FIGS. 5 and 6 is represented by a cross reference to another file accessible using the element identifier for element 89.

This process of down-conversion uses a mapping table that maps elements in the source markup language to corresponding elements in the target markup language. The mapping table is a declarative specification that operates on document structure. One form of mapping table is a style sheet defined for a particular document type. An example table for converting SGML to HTML is shown in FIG. 12A. In particular, the default is that an element is deleted as shown in row 200. Row 202 indicates that a <title> tag converts to an <Hi> tag. A <chaptitle> tag is converted to an <H2> tag (row 204). <Section> and <sectitle> tags are converted to an <H3> tag (row 206). Finally, <P> tags (row 208) convert to <P> tags and the <art> tag converts to a cross reference tag such as <A href=" . . . "> (row 210).

Figure 13:
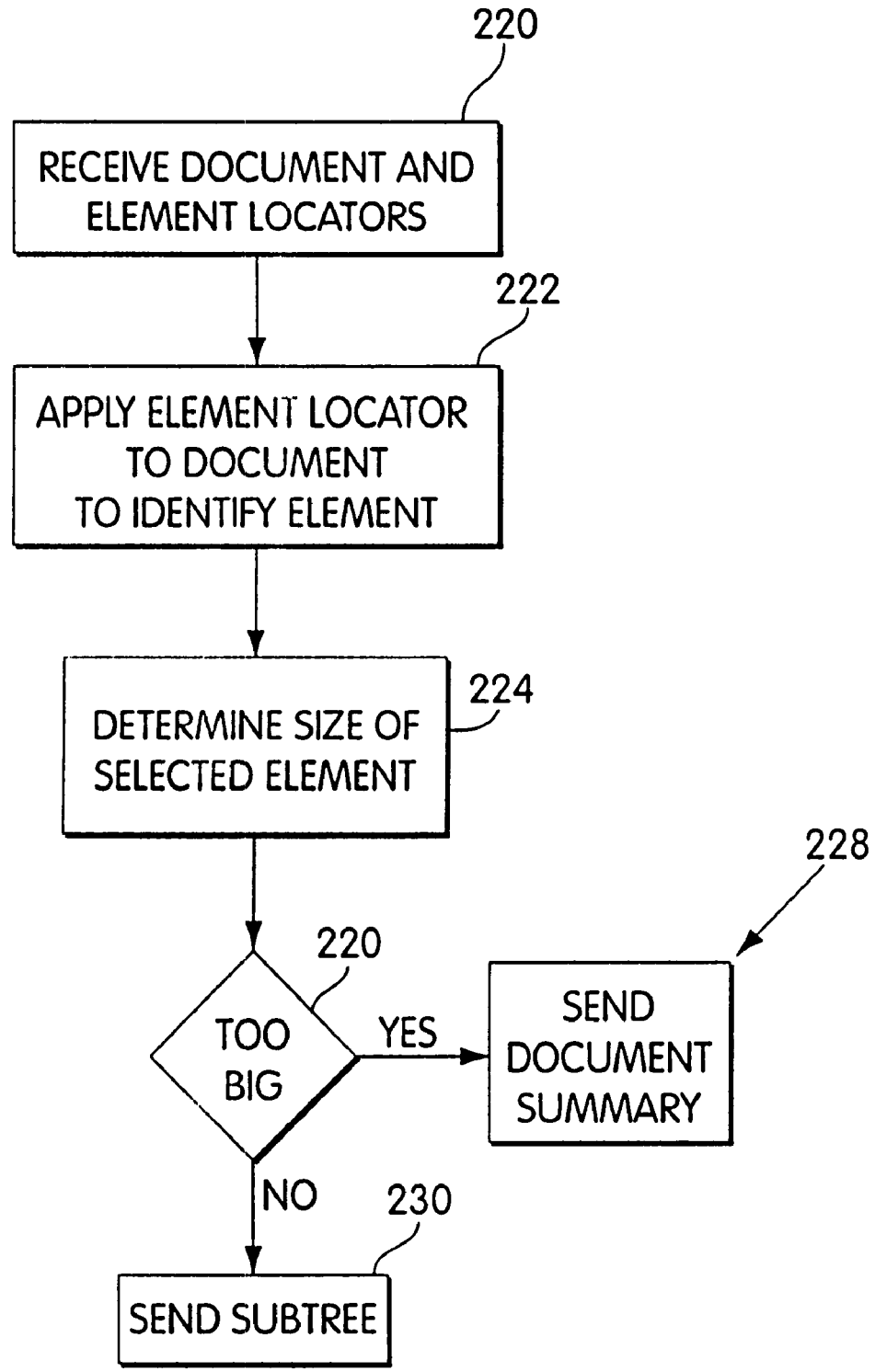
FIG. 13 is a flowchart describing how the server processes a request for a portion of a document.

Processing of a document locator and element locator to process and send a subtree of a structured document will now be described in connection with FIG. 13. The first step, performed by the server, is receiving the document and element locators, as shown in step 220. The element locator is applied to the document indicated by the document locator in step 222 to identify and access the referenced element. Using a preprocessed representation of the document, including an element directory 91 as shown in FIG. 6, this step would retrieve the entry for the given element identifier in the element directory 91. This entry contains information which then provides indicators of other elements in the document structure and the location of text and other information.

Next, the size of the selected element is determined in step 224. This step permits the system to avoid sending a document which is too large to send in an acceptable period of time. How size of a selected element is determined is described in more detail below in connection with FIG. 14.

Given the determined size of the selected element, if it is too big (as determined in step 226) a document summary, such as a table of contents, or other navigational aid, is sent in step 228 rather than the actual text of the selected element. Such aids could also be generated like a header or footer to be sent with a document fragment. This process is described in more detail below in connection with FIG. 16. If the determined size is not too big, the selected subtree is sent in step 230. The step of sending the selected subtree includes the down-conversion process from SGML to HTML and is described in more detail below in connection with FIG. 15.

Figure 14:
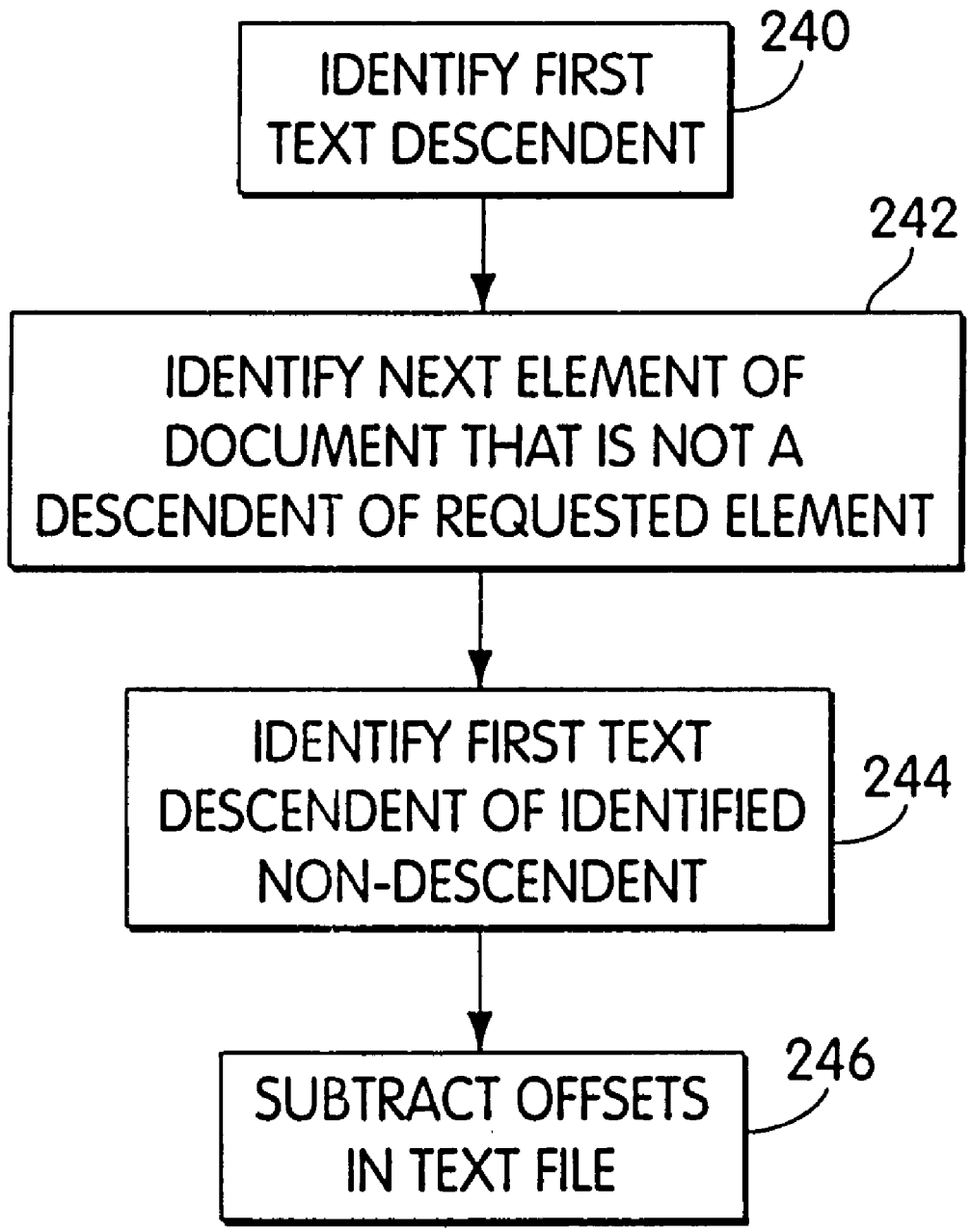
FIG. 14 is a flowchart describing how the size of a document fragment is determined.

Determination of the size of the selected element will now be described in connection with FIG. 14. There are many methods to determine the size of the selected portion of a document which generally depends on how the document is represented and parsed by the system and is of little consequence if efficient. The size may also be pre-computed and stored for each element. The following example assumes that an element directory such as shown in FIG. 6 is used.

The first step of determining the size of a selected portion of a document involves identifying the first text descendant of the selected element, as shown in step 240. This step is performed by simply accessing the element directory 91 in a sequential manner starting with the selected element until a text element is identified. For example, if the selected element is element 71 in FIG. 5, the first text descendant would be element 73. Next, the next element of the document which is not a descendant of the selected document is identified in step 242. This element is generally the right sibling of either the selected element or the closest ancestor having a right sibling. In particular, element 76, as shown in FIG. 5, would be identified by step 242 if the selected element is element 71.

The first text descendant of the element identified in step 242 is then identified in step 244. This identification may be performed in the same manner as described above in connection with step 240. In this example, the first text descendant of element 76 is element 79.

By identification of text elements in step 240 and 244, the element directory 91 may be used to determine the location or offsets in a text file of the text content of these text elements. These offsets in the text file are provided by field 104 for the selected text elements. The offsets are subtracted to provide an estimate of the size of the selected portion of the document.

The process of sending a subtree, step 230 in FIG. 13, will now be described in more detail in connection with FIG. 15. This process is very similar to the process of rendering an SGML document using style sheets as described in U.S. Pat. No. 5,557,722. The process of traversing the SGML document to identify elements and their tags and to apply corresponding style sheets is described therein. Additionally, the rendering process results in the generation of a document in a second markup language, which is then transmitted across the network to a client system. This translation may be made by using style sheets, in a manner described below, to implement a mapping table. Graphic display commands and formatting properties are applied by the client system that parses the down-converted document chunk into a formatted display on the client computer screen.

In the system described here, context information may be combined with each transmitted chunk of the SGML document. Such context information may be similar to header and footer information on paginated printed copies of a rendered SGML document. Such context information may also include copyright notices, disclaimers, or other content.

Figure 15:
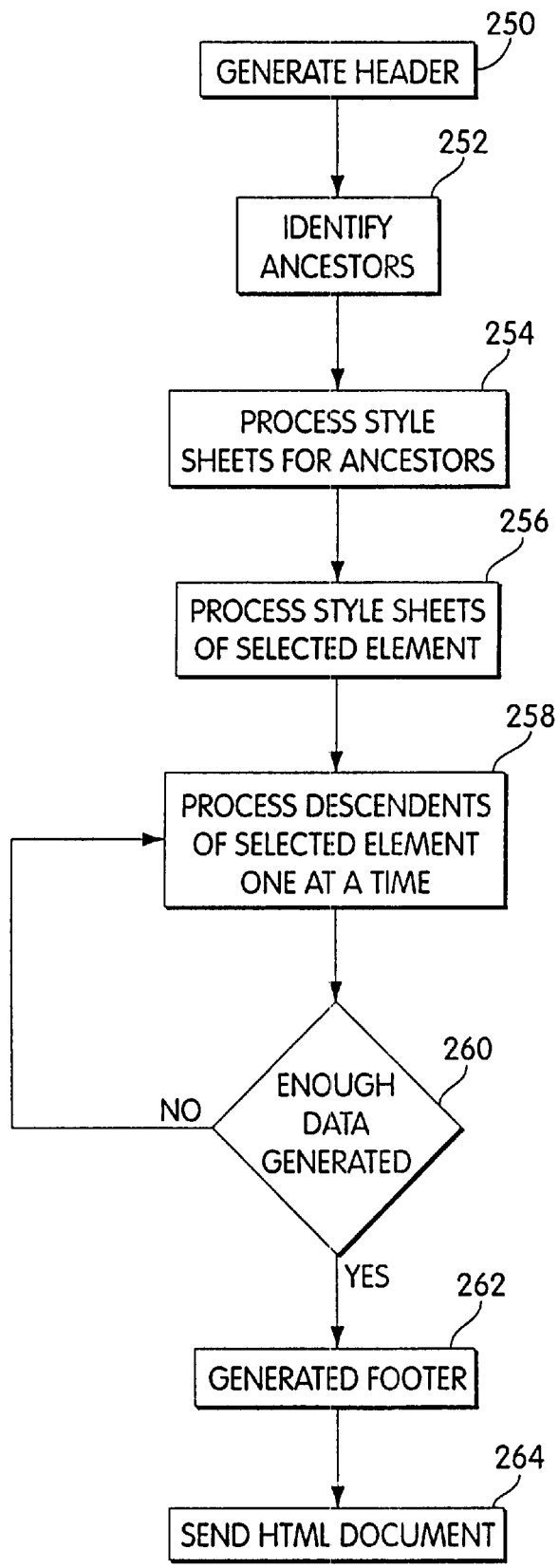
FIG. 15 is a flowchart describing how a markup document is down-converted to a document using a different markup language.

FIG. 15 illustrates the steps taken by the server to down-convert an SGML document fragment to generate an HTML document. While the following description uses SGML and HTML as example source and target markup languages, it should be understood that other markup languages may be used. The down-conversion process begins, with step 250 of generating header information. The header information is defined by style definition for a "#header" style in a style sheet for the given document type definition of the selected SGML document. This "#header" style should not be confused with a <header> element, but is rather a reserved style name. Such a style sheet typically defines, for each style, the attributes <text-before>, <text-after> and <hide>. If the <hide> attribute is false for the style definition of the "#header" style, the header is displayed. This #header style may also be used to generate a header for a printed output. Style definitions of other elements and to perform other features are described in more detail below. Example style definitions of the #header style are provided below. Functions to be evaluated within a style definition are evaluated in the context of the particular element to which the style is currently being applied. In example 3, the function "get_type" returns the element type of the parent of the header element, such as "Chapter" or "Section". The function "get_attr" obtains the copyright date of the root element, i.e., the book. The "get_env" function returns a named piece of information from the environment of the server.

```
<style Name=#header>
    <text-before> "This document Copyright 1996"
        </text-before>
    <text-after> </text-after>
    <hide> false </hide>
</style>
                        Example 1
<style Name=#header>
    <text-before> "<A href=home.html> image.gif <A>"
        </text-before>
    <text-after> </text-after>
    <hide> false </hide>
</style>
                        Example 2
<style Name=#header>
    <text-before> "This"; get_type(parent( )); "Copyright";
        get_attr(root( ),"copyright_date");
        get_env(owner_name)
        </text-before>
    <text-after> </text-after>
    <hide> false </hide>
</style>
                        Example 3
```

In any of these examples, the content appended to the document may be defined by either the #header or the #footer styles, using either the text-before or text-after fields. It should be understood that using the #footer style places the additional content at the end of the document fragment being sent, and that using the header style places the additional content at the beginning.

This feature is particularly useful for generating copyright notices on the fly for arbitrary fragments of the SGML document to be transmitted. Thus, these notices do not have to be prepared in advance for particular selected document fragments and allows for a dynamic selection of fragments. The context information may also be used for a variety of customizations, particularly "button bars", other graphical images or text that are linked to commands or other portions of a document on the World Wide Web.

Steps 252 through 260 generally describe the same steps used to render a document as described in U.S. Pat. No. 5,557,722. The difference in this invention arises in the use of the style sheet which implements the document type definition mapping table. By use of the style sheets to implement this mapping table, SGML documents in other document type definitions (DTDs) can be readily down-converted to HTML documents, though the reverse is typically more difficult. Such a mapping table is a declarative specification of the transformation.

More particularly, a portion of a document beginning with a selected element is processed by first identifying its ancestors in step 252. This is readily done using the element directory 91 discussed above. The style definitions for these ancestor elements are then processed in step 254. Generally, the ancestors are first identified and their identification is pushed onto a stack in an upward traversal of the tree structure of the document. The style definitions are processed by pushing conversion information onto a stack while popping ancestor information off another stack until the selected element is finally reached. When the selected element is reached, its style definition is processed in step 256. Descendants of the selected elements are then processed one at a time through steps 258 and 260 until enough data has been processed, as determined by step 260. A simple way to determine whether enough data has been generated is by merely setting a threshold on the amount of data in the resulting HTML document. Data may also be limited for other reasons. For example, given an indication of the bandwidth available to a user, such as the baud rate used by the user, the amount of data sent can be limited. Additionally, given information about vision impairment of the user, the system can avoid sending images to a blind user, sending only text to be converted by the browser to audio or to braille. Such information may be indicated by the client type.

After completion of steps 258 and 260, additional context information is generated in step 262 using the #footer style. The #footer style is customizable just like the #header style as described above in connection with step 250. Step 262 completes the generation of the HTML document which then can be sent to the client system in step 264.

The use of style sheets to act as a mapping table to provide a variety of functions will now be described. The document type definition mapping table is implemented as an SGML style sheet. In particular, for each type of element tag in the document type definition for the SGML document and for the header and footer, there is a style definition in a style sheet in the following form:

```
<style Name=#tagtype>
    <text-before> . . . </text-before>
    <text-after> . . . </text-after>
    <hide> . . . </hide>
</style>
```

While the style sheets may include numerous properties, the ones primarily used for a mapping table are the <text-before>, <text-after>, and <hide> attributes. The <hide> attribute is used to delete elements of which the content is not sent or down-converted. For example, some information found in an SGML document, such as the front matter or information requiring security access, can be prevented from being sent. The <hide> attribute is true when the element should not be sent and is false otherwise. (conditional operations may be provided in the <hide> attribute for security functions.

The <text-before> and <text-after> attributes are used to generate the HTML tags corresponding to the element tag for which the style definition is being made. There is a great amount of flexibility in defining the content of the <text-before> and <text-after> tags, including conditional, logical and arithmetic operations to be performed. A powerful variety of features may be provided using such a style sheet.

In the simplest example, a paragraph element tag <P> in SGML is mapped to a like-named "<P>" in HTML by defining the following style sheet:

```
<style Name=P>
    <text-before> "<P>" </text-before>
    <text-after> "</P>" </text-after>
    <hide> false </hide>
</style>
```

More complicated HTML markup can be generated. For example, if the element tag in SGML is a warning tag <warn>, the following style sheet could be used to create an extra paragraph as a centered heading above the warning itself:

```
<style Name=warn>
    <text-before> "<P type-C>warning</P><P>"
    </text-before>
    <text-after> "</P>" </text-after>
    <hide> false </hide>
</style>
```

Cross-references within the SGML document can be generated using a style sheet, for example, one in the following form:

```
<style Name=art>
    <text-before> "<A href=http://www.ebt.com/pro/abook#EID(";
        first-child( );")>" </text-before>
    <text-after> "</A>" </text-after>
    <hide> false </hide>
</style>
```

It should be understood that the URL in this example may be constructed using functions to obtain some of its parts, such as the host identifier, to further reduce document management effort.

Tags in the source markup language which have no corresponding tag in the target markup language can be translated by having a null string for <text-be ore> and <text-after> attributes, and the <hide> attribute set to false.

Even more interesting document conversions may be made using conditional or other types of operations in the style sheets. For example, because the standard communication protocol used by the World Wide Web requires an indication of the identity of the client in any message sent from the client to the server, a conditional operation may be performed according to the identity of the client. Thus, particular features available in some client systems and not in others may be generated by the server if the presence of that client is detected. This capability eliminates the requirement of current systems that different documents be maintained for different browser types. For example, the following style sheet could be used:

```
<style Name=announce>
    <text-before> if client-type = Netscape then
        "<new-feature-tag>" else
        "<common-feature-tag>" </text-before>
    <text-after> . . . </text-after>
    <hide> false </hide>
</style>
```

The conditional operation can also be performed on the element type of the document fragment being transmitted. The following Header style sheet provides and example:

```
<style Name=#header>
    <text-before> if element-type = chap then
        "<P> This Chapter Copyright 1995 <P>" else
        "<P> This Section Copyright 1995 <P>" </text-before>
    <text-after> "" </text-after>
    <hide> false </hide>
<style>
```

Additionally, this kind of conditional branching based on the type of element selected or on the type of client detected can be used as a preprocessing or postprocessing step in the process shown, for example, in FIG. 15. For example, if a particular client is detected that can handle display of two related documents in separate windows or window portions, the process of FIG. 15 could be modified to send, first, a brief table of contents of the document, followed by any necessary delimiter, then by the processed document fragment. Manipulating such delimiters may also be useful in sending both table of contents and full-text searching results for display by the client into separate window portions.

Figure 16:
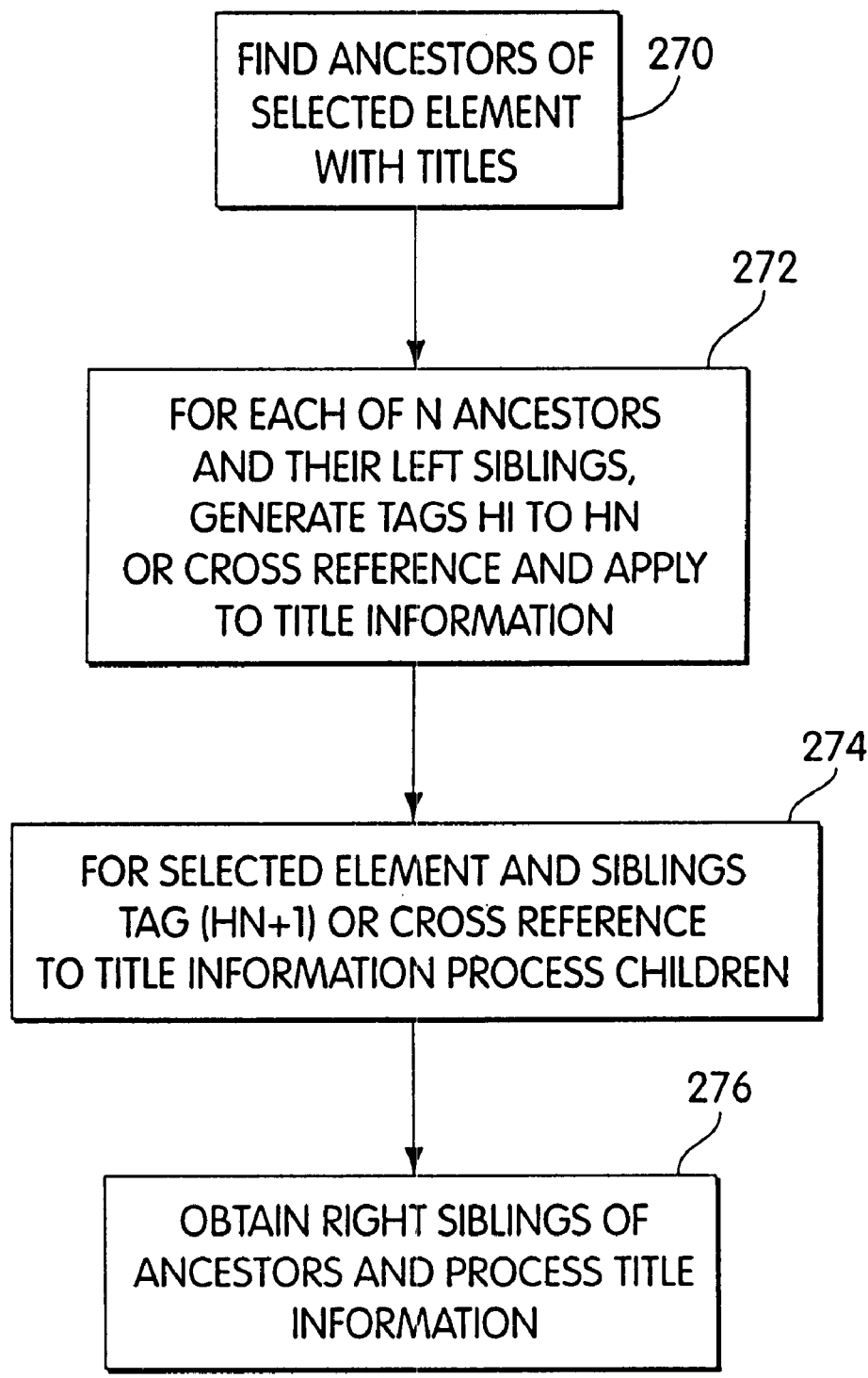
FIG. 16 is a flowchart describing how a table of contents is generated.

FIG. 16 is a flowchart describing how a table of contents is generated for a document upon receipt of an indication of an element within that document. A table of contents is represented using a table of contents directory very similar to the element directory described above. It uses the same element identifier numbers as well. However, only those elements which have titles are considered to be elements of the table of contents tree. Thus, the chapter and section tags in a sample document of FIG. 5 are included in the table of contents. For the purposes of processing a table of contents, a style definition for an element also includes a field that identifies the element containing the actual text of the title, herein called a title bearer, for the element which is a titled element. Generally, the title bearer of a titled element is the first child of the title element or has some other fixed relationship.

In general, the goal of the table of contents display is to retrieve the title information for the siblings of the selected element, the children of the selected element, and the siblings of ancestors of the selected element, but not the children of any of these ancestor siblings. In other words, if the selected portion of the table of contents to be expanded is a section within one chapter of a ten chapter book, which is a volume of a five volume set, the table of contents indicates the titles of: the volumes in the set, the chapters in the selected book, and the sections within the chapter containing the selected section as well as the subsections of the selected section.

The first step of preparing the table of contents is identifying the ancestors of the selected element with titles as indicated by step 270 in FIG. 16. These are placed on a stack in a reverse traversal of the tree. Next, for each ancestor, the title information of its left siblings is then obtained and processed. After processing all of the left sisters, the children of the selected elements are then processed after processing of the selected elements left siblings. After processing the selected element, the right siblings of the ancestors are then processed in step 278. Processing and display of either or both of the left and right siblings of ancestor elements is optional.

The resulting table of contents document includes the printed titles of each section as hypertext links to those sections. These are generated by the following markup in HTML: <A HREF=http://www.ebt.com/pro/abook#EID(x)> "Title of element" </A>, where x is the element identifier of the titled element and "Title of element" is its title obtained from the title bearing element.

For each of the ancestors and their siblings, it may also be desirable to place an indicator in the displayed table of contents to show whether further expansion of that level of the tree is possible within the table of contents structure. An element has this status when any of its children are titled and have corresponding title bearing elements. The indicator may be represented in the resulting table of contents document as a hypertext link that is a request to the server to further expand the table of contents based on the indicated element. Such a request is in the form of a document locator and element locator where the element locator indicates that a table of contents is desired, e.g., http://www.ebt.com/pro/abook#TOC(3).

When full-text searching capabilities are being used, an indication of the number of occurrences of a particular word also may be provided before each element in the table of contents. For example, a variable called "search-active" may be set when a search has been performed. If this variable is set, then before each title in the table of contents the following string may be inserted: "<B>#</B>", where # indicates the number of occurrences of the word in the current element, as determined by the table of FIG. 8.

By providing a client-server system for electronic publishing of document which uses a generalized markup language and a declarative specification, such as a style sheet, for down-converting document to a specific markup language, such as HTML, management of documents is greatly simplified. For example, if a new target markup language is made available or if a new tag is added to a particular markup language, all documents can be delivered in the new target markup language merely by changing the declarative specification without modifying the document. A large amount of document management effort, such as modifying individual documents and the risks inherent in such modification, is avoided. The declarative specification is also useful in an environment where a variety of client systems using different target markup languages are being used simultaneously by possible consumers of the published documents. The system described herein allows many versions of a single deliverable to be readily available to these users. Additionally, the need to maintain many small documents and to provide navigational documents is eliminated because they are generated dynamically instead. Additionally, navigational tools such as full text indices and tables of contents may be used to improve information retrieval.

An additional benefit is that by using style sheets for header and footer information, arbitrary fragments of a document may have copyright notices placed on them without having to independently create each notice.

Yet another benefit is that, by using style sheets to perform down-conversion, a wide variety of effects may be generated including client-aware and conditional effects.

An additional benefit is that delimited text, with indications of portions to be displayed in separate display areas on a computer screen, may be transmitted easily, allowing simultaneous viewing of a document fragment and a navigational tool or of two document fragments.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system for making available digital documents of different types and content, and responsive to a request for one of the documents received from another computer according to a communication protocol, the computer system comprising:

means for receiving an indication of a requested document;

means for accessing a definition of additional content for a type of the requested document;

means for generating an additional content component according to the definition of additional content for the type of the requested document;

means for selecting at least a portion of the content of the requested document;

means for combining the additional content component with the content of the selected portion of the requested document to obtain an output document; and means for packaging and transmitting the output document to the other computer according to the communication protocol.

2. The computer system of claim 1, wherein the requested document is an digital document having fixed text content and fixed structure defined by descriptive markup defining a plurality of hierarchical elements providing an indication of structure of the digital document.

3. The computer system of claim 2, further comprising:

means for transforming the portion of the requested document according to the structure of the document.

4. The computer system of claim 3, wherein the means for transforming includes means for applying a declarative specification for the document type of the requested document to the elements in the portion of the document.

5. The computer system of claim 2, wherein:

the requested document is defined in a first markup language, the output document is defined in a second markup language;

the system further comprises means for accessing a mapping table which defines how to map elements in the first markup language to elements in the second markup language; and the means for combining includes means for converting the selected portion of the requested document from the first markup language to the second markup language using the mapping table.

6. The computer system of claim 1, further comprising:

means for transforming the portion of the requested document according to the document type.

7. The computer system of claim 1, further comprising:

means for transforming the portion of the requested document according to an identity of the other computer.

8. The computer system of claim 1, further comprising:

means for transforming the portion of the requested document according to environmental information of the computer system.

9. The computer system of claim 1, wherein the style definition includes a function to be evaluated in context with an element to which the style definition is applied.

10. A computer-implemented process for making available digital documents of different types and content, and responsive to a request for one of the documents received from another computer according to a communication protocol, comprising the steps of:

receiving an indication of a requested document;

accessing a definition of additional content for a type of the requested document;

generating an additional content component according to the definition of additional content for the type of the requested document;

selecting at least a portion of the content of the requested document;

combining the additional content component with the content of the selected portion of the requested document to obtain an output document; and packaging and transmitting the output document to the other computer according to the communication protocol.

11. The process of claim 10, wherein the requested document is a digital document having fixed text content and fixed structure defined by descriptive markup defining a plurality of hierarchical elements providing an indication of structure of the digital document.

12. The process of claim 11, further comprising the step of:

transforming the portion of the requested document according to the structure of the document.

13. The process of claim 12, wherein the step of transforming includes the step of applying a declarative specification for the document type of the requested document to the elements in the portion of the document.

14. The process of claim 11, wherein:

the requested document is defined in a first markup language, the output document is defined in a second markup language;

the process further comprises accessing a mapping table which defines how to map elements in the first markup language to elements in the second markup language; and the step of combining includes converting the selected portion of the requested document from the first markup language to the second markup language using the mapping table.

15. The process of claim 10, further comprising the step of:

transforming the portion of the requested document according to the document type.

16. The process of claim 3, further comprising the step of:

transforming the portion of the requested document according to an identity of the other computer.

17. The process of claim 3, further comprising the step of:

transforming the portion of the requested document according to environmental information of the computer system.

18. The process of claim 17, wherein the style definition includes a function to be evaluated in context with an element to which the style definition is applied.

19. A computer system for making available digital documents of different types and content, and responsive to a request for one of the documents received from another computer according to a communication protocol, the computer system comprising:

a data access component which provides access to a definition of additional content for a type of document;

a data generating component which receives the type of the requested document as an input and produces additional content at an output, wherein the data generating component generates the additional content according to the definition of additional content for the type of the requested document;

a data selecting component which receives an indication of the requested document as an input and produces at least a portion of the content of the requested document at an output;

a data processing component which receives the output of the data selecting component and the output of the data generating component as inputs and produces an output document at an output, wherein the data processing component combines the additional content and the content of the selected portion; and a document packaging and transmission component which receives the output document at an input and produces the document packaged for transmission at an output.

20. The computer system of claim 19, wherein the requested document is a digital document having fixed text content and fixed structure defined by descriptive markup defining a plurality of hierarchical elements providing an indication of structure of the digital document.

21. The computer system of claim 20, wherein the data processing component includes means for transforming the selected portion of the requested document according to the structure of the requested document.

22. The computer system of claim 21, wherein the means for transforming includes means for applying a declarative specification for the document type of the requested document to the elements in the selected portion of the requested document.

23. The system of claim 20, wherein:
the requested document is defined in a first markup language, and the output document is defined in a second markup language;
the system further includes a table accessing component which provides access to a mapping table which defines how to map elements in the first markup language to elements in the second markup language; and
the data processing component includes a data converting component which receives the selected portion of the requested document in a first markup language at an input and produces the selected portion in a second markup language at an output, the data converting component using the mapping table.

24. The computer system of claim 19, wherein the data processing component includes means for transforming the selected portion of the requested document according to the requested document type.

25. The computer system of claim 19, wherein the data processing component includes means for transforming the selected portion of the requested document according to an identity of the other computer.

26. The computer system of claim 19, wherein the data processing component includes means for transforming the selected portion of the requested document according to environmental information of the other computer.

27. The computer system of claim 19, wherein the definition of additional content includes a function to be evaluated in context with an element to which the definition is applied.

28. A computer program product for making available digital documents of different types and content, and responsive to a request for one of the documents received from another computer according to a communication protocol, the product comprising:
a computer readable medium having computer program logic stored thereon, wherein the computer program logic defines:
a data access component which provides access to a definition of additional content for a type of document;
a data generating component which receives the type of the requested document as an input and produces additional content at an output, wherein the data generating component generates the additional content according to the definition of additional content for the type of the requested document;
a data selecting component which receives an indication of the requested document as an input and produces at least a portion of the content of the requested document at an output;
a data processing component which receives the output of the data selecting component and the output of the data generating component as inputs and produces an output document at an output, wherein the data processing component combines the additional content and the content of the selected portion; and
a document packaging and transmission component which receives the output document at an input and produces the document packaged for transmission at an output.

29. The computer program product of claim 28, wherein the requested document is a digital document having fixed text content and fixed structure defined by descriptive markup defining a plurality of hierarchical elements providing an indication of structure of the digital document.

30. The computer program product of claim 29, wherein the data processing component includes means for transforming the selected portion of the requested document according to the structure of the requested document.

31. The computer program product of claim 30, wherein the means for transforming includes means for applying a declarative specification for the document type of the requested document to the elements in the selected portion of the requested document.

32. The computer program product of claim 30, wherein:
the requested document is defined in a first markup language, and the output document is defined in a second markup language;
the computer program logic further defines a table accessing component which provides access to a mapping table which defines how to map elements in the first markup language to elements in the second markup language; and
the data processing component includes a data converting component which receives the selected portion of the requested document in a first markup language at an input and produces the selected portion in a second markup language at an output, the data converting component using the mapping table.

33. The computer program product of claim 28, wherein the data processing component includes means for transforming the selected portion of the requested document according to the requested document type.

34. The computer program product of claim 28, wherein the data processing component includes means for transforming the selected portion of the requested document according to an identity of the other computer.

35. The computer program product of claim 28, wherein the data processing component includes means for transforming the selected portion of the requested document according to environmental information of the other computer.

36. The computer program product of claim 28, wherein the definition of additional content includes a function to be evaluated in context with an element to which the definition is applied.

37. A process for making a digital information product comprising computer data signals defining a digital form of a digital document, wherein the process makes available digital documents of different types and content, and is responsive to a request for one of the documents, the request received from another computer according to a communication protocol, the process comprising the steps of:
receiving an indication of a requested document;
accessing a definition of additional content for a type of the requested document;
generating an additional content component according to the definition of additional content for the type of the requested document;

selecting at least a portion of the content of the requested document;

combining the additional content component with the content of the selected portion of the requested document to obtain an output document, and encoding the output document in a computer data signal; and packaging and transmitting the output document to the other computer according to the communication protocol.

38. The process of claim 37, wherein the requested document is a digital document having fixed text content and fixed structure defined by descriptive markup defining a plurality of hierarchical elements providing an indication of structure of the digital document.

39. The process of claim 38, wherein the step of combining includes transforming the selected portion of the requested document according to the structure of the requested document.

40. The process of claim 39, wherein the step of transforming includes the step of applying a declarative specification for the document type of the requested document to the elements in the selected portion of the requested document.

41. The process of claim 38, wherein the requested document is defined in a first markup language, and the output document is defined in a second markup language;

the process further comprises accessing a mapping table which defines how to map elements in the first markup language to elements in the second markup language; and the step of combining includes converting the selected portion of the requested document from the first markup language to the second markup language using the mapping table.

42. The process of claim 37, wherein the step of combining includes transforming the selected portion of the requested document according to the requested document type.

43. The process of claim 37, wherein the step of combining includes transforming the selected portion of the requested document according to an identity of the other computer.

44. The process of claim 37, wherein the step of combining includes transforming the selected portion of the requested document according to environmental information of the other computer.

45. The process of claim 37, wherein the definition of additional content includes a function to be evaluated in context with an element to which the definition is applied.

46. A computer-implemented process of producing a digital form of a digital document, wherein the document can be one of several different types and with varying content, the process comprising:

sending a request for at least part of a document;

accessing a definition of additional content for a type of the document;

generating an additional content component according to the definition of additional content for the type of the document;

receiving a selected portion of the content of the document, the portion having been selected in accordance with the request;

combining the additional content component with the content of the portion of the document to obtain a digital form of the document.

47. The process of claim 46, wherein the document is a digital document having fixed text content and fixed structure defined by descriptive markup defining a plurality of hierarchical elements providing an indication of structure of the digital document.

48. The process of claim 47, wherein the step of combining includes transforming the selected portion of the document according to the structure of the document.

49. The process of claim 48, wherein the step of transforming includes the step of applying a declarative specification for the document type of the document to the elements in the selected portion of the document.

50. The process of claim 47, wherein:

the document is defined in a first markup language, and the digital form is defined in a second markup language;

the process further comprises accessing a mapping table which defines how to map elements in the first markup language to elements in the second markup language; and the step of combining includes converting the selected portion of the document from the first markup language to the second markup language using the mapping table.

51. The process of claim 46, wherein the step of combining includes transforming the selected portion of the document according to the document type.

52. The process of claim 46, wherein the step of combining includes transforming the selected portion of the document according to an identity of a computer which sent the request.

53. The process of claim 46, wherein the step of combining includes transforming the selected portion of the document according to environmental information of a computer which sent the request.

54. The process of claim 46, wherein the definition of additional content includes a function to be evaluated in context with an element to which the definition is applied.

55. The process of claim 46, further comprising:

receiving a request for a part of a document, wherein the sent request corresponds to the received request; and packaging and transmitting the digital form of the document to another computer according to a communication protocol.

56. A process for making a digital information product comprising computer data signals defining a digital form of a digital document, wherein the document can be one of several different types and with varying content, the process comprising:

sending a request for at least part of a document;

accessing a definition of additional content for a type of the document;

generating an additional content component according to the definition of additional content for the type of the document;

receiving a selected portion of the content of the document, the portion having been selected in accordance with the request;

combining the additional content component with the content of the portion of the document to obtain a digital form of the document, and encoding the digital form in a computer data signal.

57. The process of claim 56, wherein the document is a digital document having fixed text content and fixed structure defined by descriptive markup defining a plurality of hierarchical elements providing an indication of structure of the digital document.

58. The process of claim 57, wherein the step of combining includes:
transforming the selected portion of the document according to the structure of the document.

59. The process of claim 56, wherein the step of transforming includes the step of applying a declarative specification for the document type of the document to the elements in the selected portion of the document.

60. The process of claim 57, wherein:
the document is defined in a first markup language, and the digital form is defined in a second markup language;
the process further comprises accessing a mapping table which defines how to map elements in the first markup language to elements in the second markup language; and
the step of combining includes converting the selected portion of the document from the first markup language to the second markup language using the mapping table.

61. The process of claim 56, wherein the step of combining includes transforming the selected portion of the document according to the document type.

62. The process of claim 56, wherein the step of combining includes transforming the selected portion of the document according to an identity of a computer which sent the request.

63. The process of claim 56, wherein the step of combining includes transforming the selected portion of the document according to environmental information of a computer which sent the request.

64. The process of claim 56, wherein the definition of additional content includes a function to be evaluated in context with an element to which the definition is applied.

65. The process of claim 56, further comprising:
receiving a request for a part of a document, wherein the sent request corresponds to the received request; and
packaging and transmitting the digital form of the document to another computer according to a communication protocol.

66. A computer system for producing a digital form of a digital document, wherein the document can be one of several different types and with varying content, the system comprising:
means for sending a request for at least part of a document;
means for accessing a definition of additional content for a type of the document;
means for generating an additional content component according to the definition of additional content for the type of the document;
means for receiving a selected portion of the content of the document, the portion having been selected in accordance with the request;
means for combining the additional content component with the content of the portion of the document to obtain the digital form of the document.

67. The computer system of claim 66, wherein the document is a digital document having fixed text content and fixed structure defined by descriptive markup defining a plurality of hierarchical elements providing an indication of structure of the digital document.

68. The computer system of claim 67, wherein the means for combining includes means for transforming the selected portion of the document according to the structure of the document.

69. The computer system of claim 68, wherein the means for transforming includes means for applying a declarative specification for the document type of the document to the elements in the selected portion of the document.

70. The computer system of claim 67, wherein:
the document is defined in a first markup language, the digital form is defined in a second markup language;
the system further comprises means for accessing a mapping table which defines how to map elements in the first markup language to elements in the second markup language; and
the means for combining includes means for converting the selected portion of the document from the first markup language to the second markup language using the mapping table.

71. The computer system of claim 66, wherein the means for combining includes means for transforming the selected portion of the document according to the document type.

72. The computer system of claim 66, wherein the means for combining includes means for transforming the selected portion of the document according to an identity of a computer which sent the request.

73. The computer system of claim 66, wherein the means for combining includes means for transforming the selected portion of the document according to environmental information a computer which sent the request.

74. The computer system of claim 66, wherein the definition of additional content includes a function to be evaluated in context with an element to which the definition is applied.

75. The computer system of claim 66, further comprising:
means for receiving a request for a part of a document, wherein the sent request corresponds to the received request; and
means for packaging and transmitting the digital form of the document to another computer according to a communication protocol.

76. A computer system for producing a digital form of a digital document, wherein the document can be one of several different types and with varying content, the system comprising:
a data requesting component which produces a request for at least part of a document at an output;
a data access component which accesses a definition of additional content for a type of the document;
a data generation component which receives the type of the document as an input and produces additional content at an output, wherein the data processing component generates the additional content according to the definition of additional content for the type of the document; and
a data processing component which receives a selected portion of the content of the document at one input and the output of the data generation component at another input and produces a digital form of the document at an output, wherein the portion was selected in accordance with the request, and wherein the data processing component combines the additional content and the content of the selected portion.

77. The computer system of claim 76, wherein the document is a digital document having fixed text content and fixed structure defined by descriptive markup defining a plurality of hierarchical elements providing an indication of structure of the digital document.

78. The computer system of claim 77, wherein the data processing component includes means for transforming the selected portion of the document according to the structure of the document.

79. The computer system of claim 78, wherein the means for transforming includes means for applying a declarative specification for the document type of the document to the elements in the selected portion of the document.

80. The computer system of claim 77, wherein:

the document is defined in a first markup language, and the digital form is defined in a second markup language;

the system further includes a table accessing component which provides access to a mapping table which defines how to map elements in the first markup language to elements in the second markup language; and the data processing component includes a data converting component which receives the selected portion of the document in a first markup language at an input and produces the selected portion in a second markup language at an output, the data converting component using the mapping table.

81. The computer system of claim 76, wherein the data processing component includes means for transforming the selected portion of the document according to the document type.

82. The computer system of claim 76, wherein the data processing component includes means for transforming the selected portion of the document according to an identity of a computer which sent the request.

83. The computer system of claim 76, wherein the data processing component includes means for transforming the selected portion of the document according to environmental information of a computer which sent the request.

84. The computer system of claim 76, wherein the definition of additional content includes a function to be evaluated in context with an element to which the definition is applied.

85. The computer system of claim 76, wherein the data requesting component receives a request for a part of a document at an input, and the computer system further comprises:

a document packaging and transmission component which receives the digital form at an input and produces the digital form of the document packaged for transmission at an output.

86. A computer program product for producing a digital form of a digital document, wherein the document can be one of several different types and with varying content, the product comprising:

a computer readable medium having computer program logic stored thereon, wherein the computer program logic defines:

a data requesting component which produces a request for at least part of a document at an output;

a data access component which accesses a definition of additional content for a type of the document;

a data generation component which receives the type of the document as an input and produces additional content at an output, wherein the data processing component generates the additional content according to the definition of additional content for the type of the document; and a data processing component which receives a selected portion of the content of the document at one input and the output of the data generation component at another input and produces a digital form of the document at an output, wherein the portion was selected in accordance with the request, and wherein the data processing component combines the additional content and the content of the selected portion.

87. The computer program product of claim 86, wherein the document is a digital document having fixed text content and fixed structure defined by descriptive markup defining a plurality of hierarchical elements providing an indication of structure of the digital document.

88. The computer program product of claim 87, wherein the data processing component includes means for transforming the selected portion of the document according to the structure of the document.

89. The computer program product of claim 88, wherein the means for transforming includes means for applying a declarative specification for the document type of the document to the elements in the selected portion of the document.

90. The computer program product of claim 87, wherein:

the document is defined in a first markup language, and the digital form is defined in a second markup language;

the computer program logic further defines a table accessing component which provides access to a mapping table which defines how to map elements in the first markup language to elements in the second markup language; and the data processing component includes a data converting component which receives the selected portion of the document in a first markup language at an input and produces the selected portion in a second markup language at an output, the data converting component using the mapping table.

91. The computer program product of claim 86, wherein the data processing component includes means for transforming the selected portion of the document according to the document type.

92. The computer program product of claim 86, wherein the data processing component includes means for transforming the selected portion of the document according to an identity of a computer on which the which sent the request.

93. The computer program product of claim 86, wherein the data processing component includes means for transforming the selected portion of the document according to environmental information of a computer which sent the request.

94. The computer program product of claim 86, wherein the definition of additional content includes a function to be evaluated in context with an element to which the definition is applied.

95. The computer program product of claim 86, wherein the data requesting component receives a request for a part of a document at an input, and wherein the computer program logic further defines:

a document packaging and transmission component which receives the digital form at an input and produces the digital form of the document packaged for transmission at an output.

* * * * *